US012457607B2

United States Patent
Nam et al.

(10) Patent No.: US 12,457,607 B2
(45) Date of Patent: Oct. 28, 2025

(54) MULTI-SLOT PHYSICAL DOWNLINK CONTROL CHANNEL MONITORING

(71) Applicant: QUALCOMM Incorporated, San Diego, CA (US)

(72) Inventors: Wooseok Nam, San Diego, CA (US); Mostafa Khoshnevisan, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 18/054,034

(22) Filed: Nov. 9, 2022

(65) Prior Publication Data

US 2023/0217436 A1    Jul. 6, 2023

Related U.S. Application Data

(60) Provisional application No. 63/266,497, filed on Jan. 6, 2022.

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC .......................... H04W 72/1273; H04W 72/23
See application file for complete search history.

(56) References Cited

U.S. PATENT DOCUMENTS

| 2018/0227939 | A1* | 8/2018 | Bagheri | H04W 72/1268 |
| 2018/0376501 | A1* | 12/2018 | John Wilson | H04W 72/046 |
| 2019/0349180 | A1* | 11/2019 | Lu | H04L 27/2607 |
| 2020/0280971 | A1* | 9/2020 | Moon | H04L 5/0053 |
| 2020/0351682 | A1* | 11/2020 | Cirik | H04W 76/28 |

(Continued)

FOREIGN PATENT DOCUMENTS

| WO | WO-2021024184 A1 | 2/2021 |
| WO | WO-2022186624 A1 | 9/2022 |

(Continued)

OTHER PUBLICATIONS

CATT: "PDCCH Monitoring Adaptation", 3GPP TSG RAN WG1 #104-e, R1-2100395, e-Meeting, Jan. 25-Feb. 5, 2021, vol. RAN WG1, No. e-Meeting, Jan. 25, 2021-Feb. 5, 2021, Jan. 19, 2021, 5 Pages, XP051970998, the whole document.

(Continued)

*Primary Examiner* — Jael M Ulysse
(74) *Attorney, Agent, or Firm* — Harrity & Harrity, LLP

(57) ABSTRACT

Various aspects of the present disclosure generally relate to wireless communication. In some aspects, a user equipment (UE) may receive an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span. The UE may selectively perform the PDCCH monitoring in the first monitoring span or the second monitoring span based at least in part on the indication. Numerous other aspects are described.

24 Claims, 18 Drawing Sheets

(56) References Cited

U.S. PATENT DOCUMENTS

| | | | |
|---|---|---|---|
| 2020/0351847 A1* | 11/2020 | Kim | H04L 5/0094 |
| 2020/0389874 A1* | 12/2020 | Lin | H04L 5/0053 |
| 2021/0006376 A1* | 1/2021 | Cirik | H04L 1/1861 |
| 2021/0037607 A1* | 2/2021 | Hamidi-Sepehr | H04W 24/08 |
| 2021/0058970 A1* | 2/2021 | Kwak | H04W 72/23 |
| 2021/0136689 A1* | 5/2021 | Kim | H04W 24/08 |
| 2021/0168779 A1* | 6/2021 | Mondal | H04L 5/0053 |
| 2021/0250153 A1* | 8/2021 | Lin | H04W 72/23 |
| 2021/0360667 A1* | 11/2021 | Moon | H04L 5/0035 |
| 2021/0368367 A1* | 11/2021 | Jiang | H04W 52/02 |
| 2022/0030569 A1* | 1/2022 | Ma | H04L 5/0094 |
| 2022/0070899 A1* | 3/2022 | Huang | H04W 72/23 |
| 2022/0116981 A1* | 4/2022 | Saber | H04L 1/08 |
| 2022/0124622 A1* | 4/2022 | Islam | H04W 72/20 |
| 2022/0232477 A1* | 7/2022 | Kim | H04W 52/0229 |
| 2022/0287063 A1* | 9/2022 | Lin | H04W 72/23 |
| 2022/0361218 A1* | 11/2022 | He | H04L 5/0053 |
| 2023/0189305 A1* | 6/2023 | Oteri | H04W 48/12 370/329 |
| 2023/0217506 A1* | 7/2023 | Löhr | H04W 52/0229 370/329 |
| 2024/0031107 A1* | 1/2024 | Göktepe | H04L 5/0053 |
| 2024/0155636 A1* | 5/2024 | Chatterjee | H04L 27/2602 |
| 2024/0235787 A1* | 7/2024 | Shubhi | H04L 5/0053 |
| 2024/0334446 A1* | 10/2024 | Kuang | H04L 5/0053 |

FOREIGN PATENT DOCUMENTS

| | | | | |
|---|---|---|---|---|
| WO | WO-2022212688 A1 | | 10/2022 | |
| WO | WO-2023077479 A1 | * | 5/2023 | H04L 5/0053 |

OTHER PUBLICATIONS

International Search Report and Written Opinion—PCT/US2022/079633—ISA/EPO—Mar. 14, 2023.

Mediatek Inc: "On Enhancements to DCI-based UE Power Saving During DRX Active Time", 3GPP TSG RAN WG1 #104-e, R1-2100593, e-Meeting, Jan. 25-Feb. 5, 2021, vol. RAN WG1, No. e-Meeting, 8 Pages, the whole document.

\* cited by examiner

MULTI-SLOT PHYSICAL DOWNLINK CONTROL CHANNEL MONITORING

CROSS-REFERENCE TO RELATED APPLICATION

This patent application claims priority to U.S. Provisional Patent Application No. 63/266,497, filed on Jan. 6, 2022, entitled "MULTI-SLOT PHYSICAL DOWNLINK CONTROL CHANNEL MONITORING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for multi-slot physical downlink control channel monitoring.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span. The method may include selectively performing the PDCCH monitoring in the first monitoring span or the second monitoring span based at least in part on the indication.

Some aspects described herein relate to a method of wireless communication performed by a network node. The method may include transmitting an indication to perform PDCCH monitoring in a first monitoring span, of a first group of slots, and in a second monitoring span, of a second group of slots, wherein a start of the first monitoring span is at least a threshold number of slots away from a start of the second monitoring span.

Some aspects described herein relate to an apparatus for wireless communication performed by a UE. The apparatus may include a memory and one or more processors, coupled to the memory. The one or more processors may be configured to receive an indication to perform PDCCH monitoring in a first monitoring span, of a first group of slots, and in a second monitoring span, of a second group of slots, wherein a start of the first monitoring span is at least a threshold number of slots away from a start of the second monitoring span. The one or more processors may be configured to selectively perform the PDCCH monitoring in the first monitoring span or the second monitoring span based at least in part on the indication.

Some aspects described herein relate to an apparatus for wireless communication performed by a network node. The apparatus may include a memory and one or more processors, coupled to the memory. The one or more processors may be configured to transmit an indication to perform PDCCH monitoring in a first monitoring span, of a first group of slots, and in a second monitoring span, of a second group of slots, wherein a start of the first monitoring span is at least a threshold number of slots away from a start of the second monitoring span.

Some aspects described herein relate to an apparatus for wireless communication. The apparatus may include means for receiving an indication to perform PDCCH monitoring in a first monitoring span, of a first group of slots, and in a second monitoring span, of a second group of slots, wherein a start of the first monitoring span is at least a threshold number of slots away from a start of the second monitoring span. The apparatus may include means for selectively performing the PDCCH monitoring in the first monitoring span or the second monitoring span based at least in part on the indication.

Some aspects described herein relate to an apparatus for wireless communication. The apparatus may include means for transmitting an indication to perform PDCCH monitoring in a first monitoring span, of a first group of slots, and in a second monitoring span, of a second group of slots, wherein a start of the first monitoring span is at least a threshold number of slots away from a start of the second monitoring span.

Some aspects described herein relate to a non-transitory computer-readable medium that stores a set of instructions for wireless communication by a UE. The set of instructions, when executed by one or more processors of the UE, may cause the UE to receive an indication to perform PDCCH monitoring in a first monitoring span, of a first group of slots, and in a second monitoring span, of a second group of slots, wherein a start of the first monitoring span is at least a threshold number of slots away from a start of the second monitoring span. The set of instructions, when executed by one or more processors of the UE, may cause the UE to selectively perform the PDCCH monitoring in the first monitoring span or the second monitoring span based at least in part on the indication.

Some aspects described herein relate to a non-transitory computer-readable medium that stores a set of instructions for wireless communication by a network node. The set of instructions, when executed by one or more processors of the network node, may cause the network node to transmit an indication to perform PDCCH monitoring in a first monitoring span, of a first group of slots, and in a second monitoring span, of a second group of slots, wherein a start of the first monitoring span is at least a threshold number of slots away from a start of the second monitoring span.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
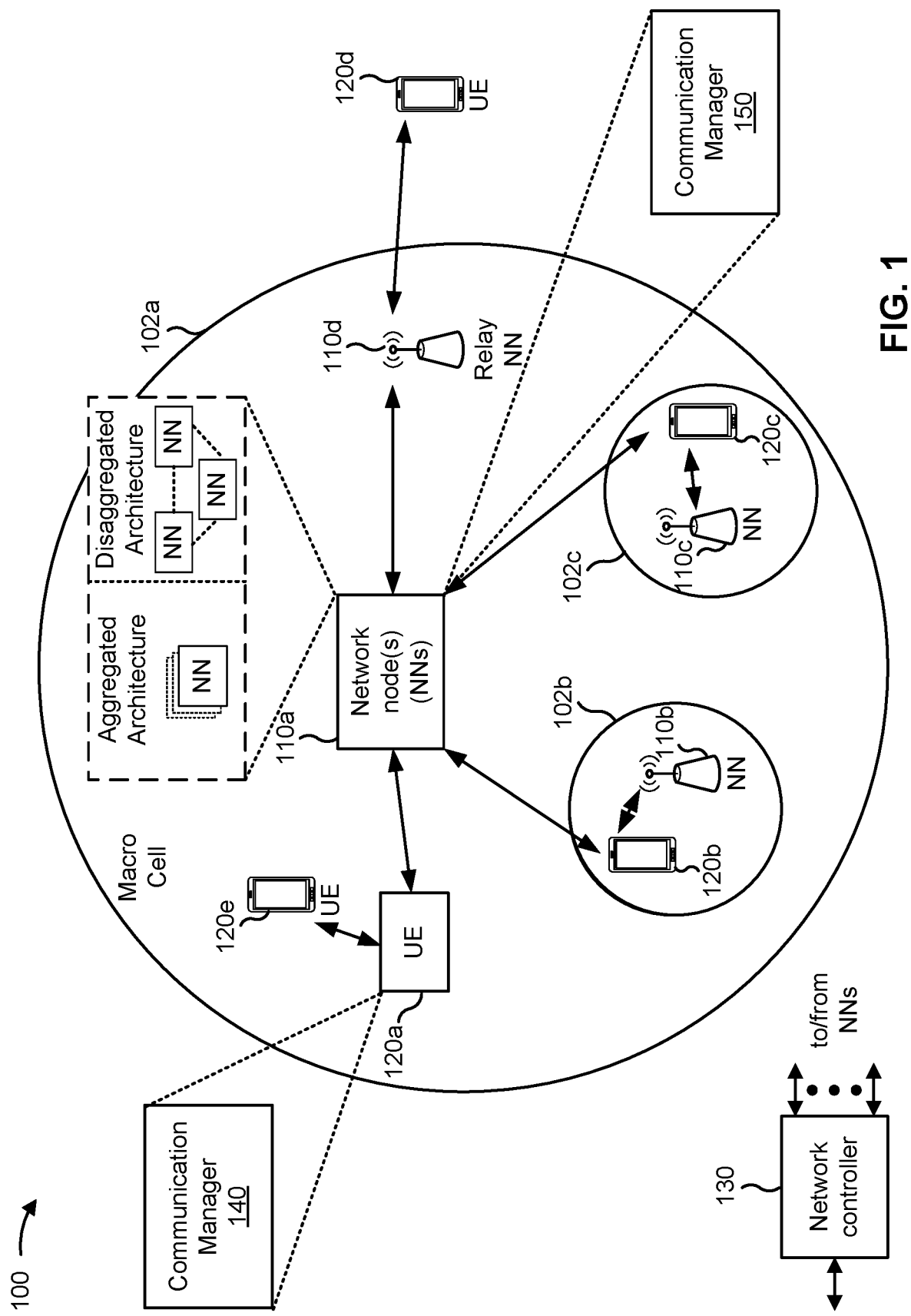
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span; and selectively perform the PDCCH monitoring in the first monitoring span or the second monitoring span based at least in part on the indication. Additionally, or alternatively, the communication manager 140 may perform one or more other operations described herein.

In some aspects, the network node 110 may include a communication manager 150. As described in more detail elsewhere herein, the communication manager 150 may transmit an indication to perform PDCCH monitoring in a first monitoring span, of a first group of slots, and in a second monitoring span, of a second group of slots, wherein a start of the first monitoring span is at least a threshold number of slots away from a start of the second monitoring span. Additionally, or alternatively, the communication manager 150 may perform one or more other operations described herein.

As indicated above, FIG. 1 is provided as an example. Other examples may differ from what is described with regard to FIG. 1.

Figure 2:
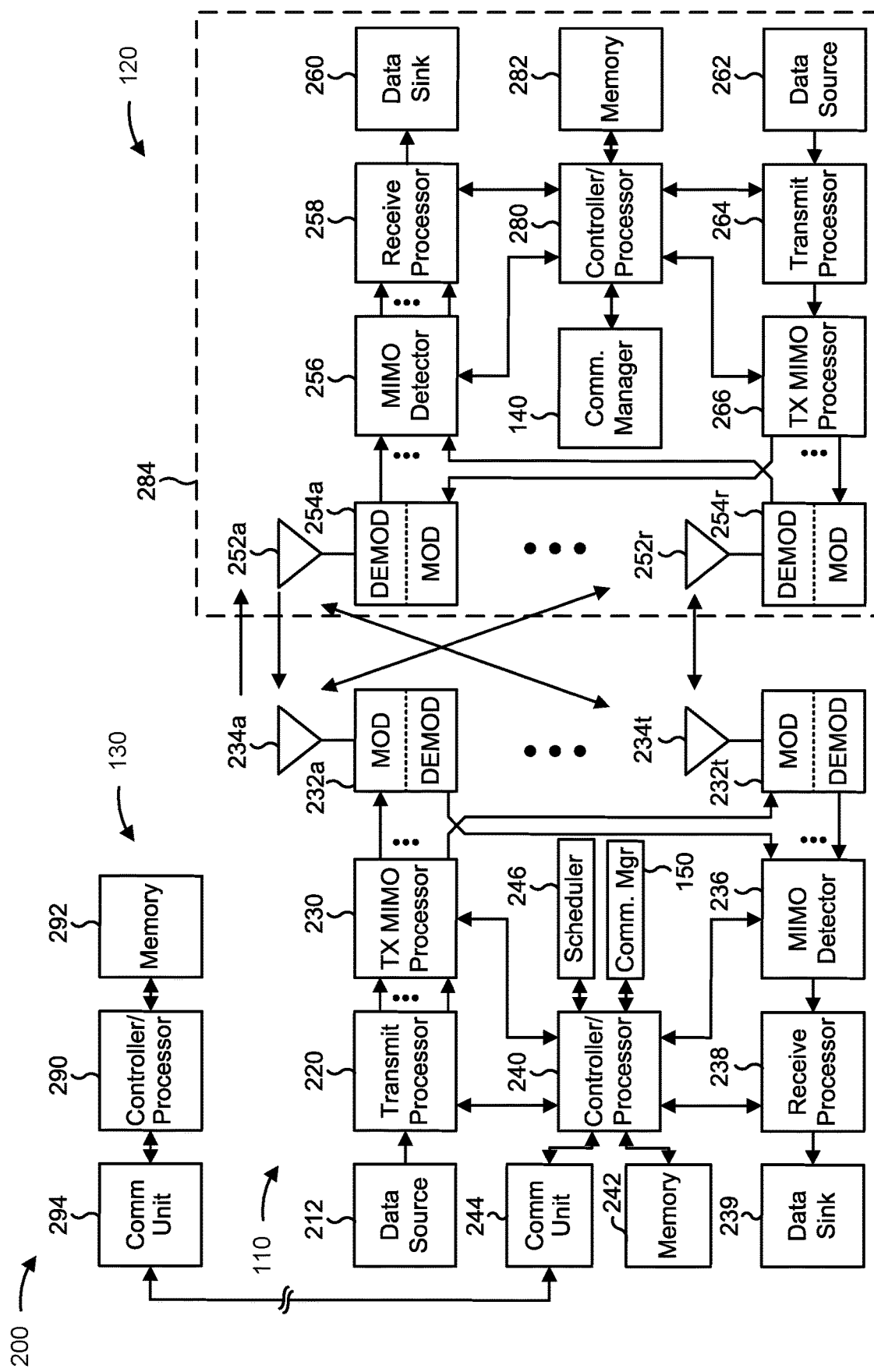
FIG. 2 is a diagram illustrating an example of a network node in communication with a user equipment (UE) in a wireless network, in accordance with the present disclosure.

FIG. 2 is a diagram illustrating an example 200 of a network node 110 in communication with a user equipment (UE) 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the network node 110, the controller/processor 280 of the UE 120, and/or any other component(s) of FIG. 2 may perform one or more techniques associated with multi-slot PDCCH monitoring, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE includes means for receiving an indication to perform PDCCH monitoring in a first monitoring span, of a first group of slots, and in a second monitoring span, of a second group of slots, wherein a start of the first monitoring span is at least a threshold number of slots away from a start of the second monitoring span; and/or means for selectively performing the PDCCH monitoring in the first monitoring span or the second monitoring span based at least in part on the indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting an indication to perform PDCCH monitoring in a first monitoring span, of a first group of slots, and in a second monitoring span, of a second group of slots, wherein a start of the first monitoring span is at least a threshold number of slots away from a start of the second monitoring span. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
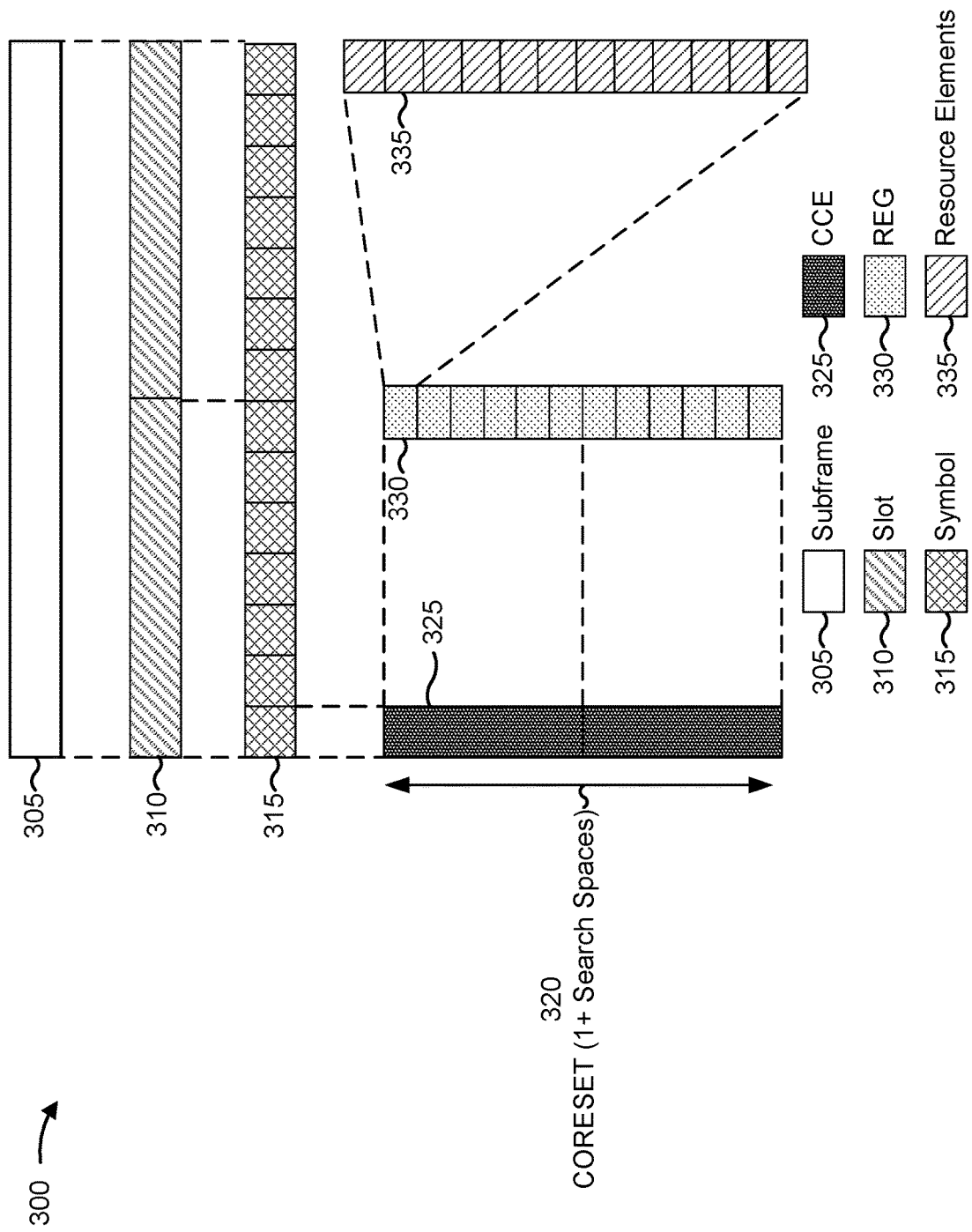
FIG. 3 is a diagram illustrating an example of a resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A network node may transmit DCI during multiple CCEs 325 (as shown), where the quantity of CCEs 325 used for transmission of DCI represents the aggregation level (AL) used by the BS for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

In some cases, as described in more detail below, the UE 120 may be configured to perform PDCCH monitoring (e.g., in the CORESET) at the slot level or at the multi-slot level.

As indicated above, FIG. 3 is provided as an example. Other examples may differ from what is described with respect to FIG. 3.

Figure 4:
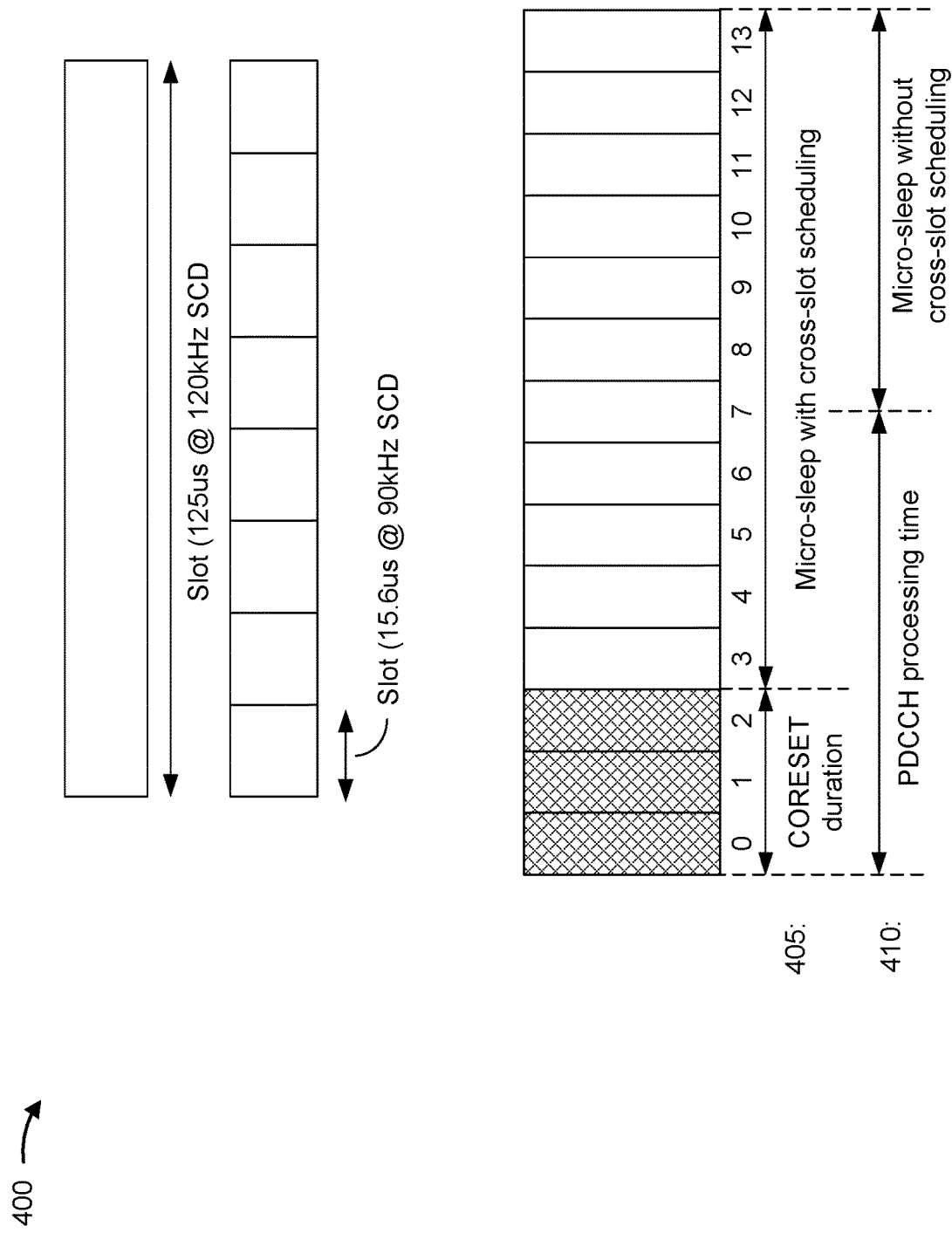
FIG. 4 is a diagram illustrating an example of physical downlink control channel (PDCCH) monitoring, in accordance with the present disclosure.

FIG. 4 is a diagram illustrating an example 400 of PDCCH monitoring, in accordance with the present disclosure. For applications with higher carrier frequencies (e.g., 52.6 GHz-114.25 GHz), an orthogonal frequency division multiplexing (OFDM) waveform with large subcarrier spacing (240 kHz-1.92 MHz) may be used, for example, to reduce phase noise and/or to fill up a large bandwidth (2 GHz). However, the slot length in such waveforms with high carrier frequencies may be short, for example, due to the large subcarrier spacing (SCS) that is required. For example, the slot length in a frequency range 2 (FR2) waveform with 120 kHz SCS may be 125 μs, while the slot length in FR2-2 waveform with 960 kHz SCS may be 15.6 μSec.

In some cases, the processing timeline of the UE 120 (e.g., for control and data processing) may not proportionally scale with the slot length. For example, the UE 120 using lower frequency ranges (e.g., FR1/FR2) may enjoy the power saving benefits of micro-sleep. However, for the UE 120 using higher frequency ranges (e.g., FR4), control channel processing may be comparable to, or may even overrun, the slot length. Therefore, micro-sleep may not be possible. In another example, the UE 120 using FR1/FR2 may be configured to monitor the PDCCH in every slot. However, in FR4 (e.g., due to the limited processing capability), the minimum PDCCH monitoring periodicity may be greater than a single slot. Thus, performing PDCCH monitoring in each slot may not be possible.

In some cases, the UE 120 may be configured to perform micro-sleeping either with cross-slot scheduling or without cross-slot scheduling. As shown in the first example 405, the UE 120 may perform PDCCH monitoring in the first three symbols of the slot, and the UE 120 may perform micro-sleeping with cross slot scheduling in the remaining 11 symbols. As shown in the second example 410, the PDCCH monitoring and processing time may require half (or more) of the slot time. Thus, the micro-sleeping without the cross-slot scheduling may be less than half of the slot length. In some cases, as described in more detail below, the UE 120 may be configured to perform multi-slot PDCCH monitoring.

As indicated above, FIG. 4 is provided as an example. Other examples may differ from what is described with respect to FIG. 4.

Figure 5:
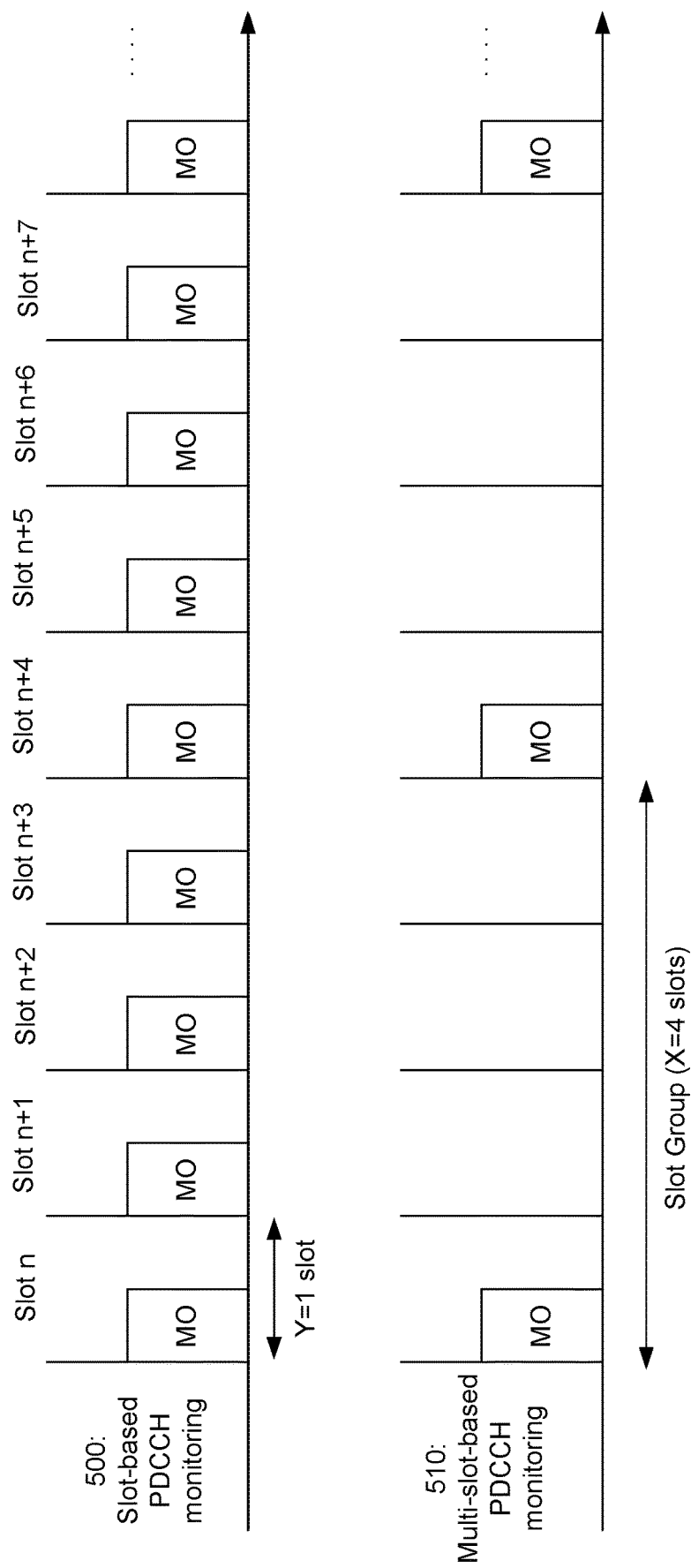
FIG. 5 is a diagram illustrating an example of slot-based PDCCH monitoring, in accordance with the present disclosure.

FIG. 5 is a diagram illustrating examples 500 and 510 of slot-based PDCCH monitoring, in accordance with the present disclosure. In some cases, as shown in the example 500, a UE, such as the UE 120, may be configured to perform PDCCH monitoring at each slot in the subframe.

In some cases, as shown in the example 510, the UE 120 may be configured to perform multi-slot PDCCH monitoring. For example, the UE 120 may be configured to monitor the PDCCH every other slot, or every few slots, instead of at every individual slot. In some cases, the variable X may represent the length of the slot group. For example, the UE 120 may be configured to perform PDCCH monitoring at every X slots of a sub-frame. Thus, a PDCCH monitoring occasion (MO) may occur every X slots in the subframe. The supported value(s) of X may be based at least in part on one or more capabilities of the UE 120, and the network node 110 may configure one or more PDCCH search spaces for the UE 120 based at least in part on the UE 120 capability reporting. In some cases, the variable Y may be used to represent a monitoring span. The monitoring span may correspond to a number of consecutive slots where monitoring occasions reside within a slot group. The monitoring occasions may be confined within the monitoring span of the slot group. For example, a monitoring span having one slot may have a value of Y=1, and a monitoring span having three consecutive slots may have a value of Y=3.

In some cases, for a Group (1) search space (SS) (e.g., Type 1 common search space (CSS) with dedicated RRC configuration and Type 3 CSS, UE-specific SS), one or more of the following may be supported:

The SS may be monitored within Y consecutive slots within a slot group of X slots;

The Y consecutive slots can be located anywhere within the slot group of X slots;

The location of the Y consecutive slots within the slot group of X slots may be maintained across different slot groups; and Blind decoding (BD) attempts for all Group (1) SSs may be restricted to fall within the same Y consecutive slots.

In some cases, for a Group (2) SS (e.g., Type 1 CSS without dedicated RRC configuration and type 0, 0A, and 2 CSS), SS monitoring locations may be anywhere within a slot group of X slots (with possible exceptions).

In some cases, the supported combinations of (X, Y) may be as follows:

A UE 120 capable of multi-slot monitoring may (e.g., mandatorily) support:

For SCS 480 kHz: (X, Y)=(4,1); and
For SCS 960 kHz: (X, Y)=(8,1).

A UE 120 capable of multi-slot monitoring may (e.g., optionally) support:

For SCS 480 kHz: (X, Y)=(4,2); and
For SCS 960 kHz: (X, Y)=(8,4), (4,2), (4,1).

As described in more detail below, the UE 120 may be configured to switch between one or more search space sets in order to perform multi-slot PDCCH monitoring.

As indicated above, FIG. 5 is provided as an example. Other examples may differ from what is described with respect to FIG. 5.

Figure 6:
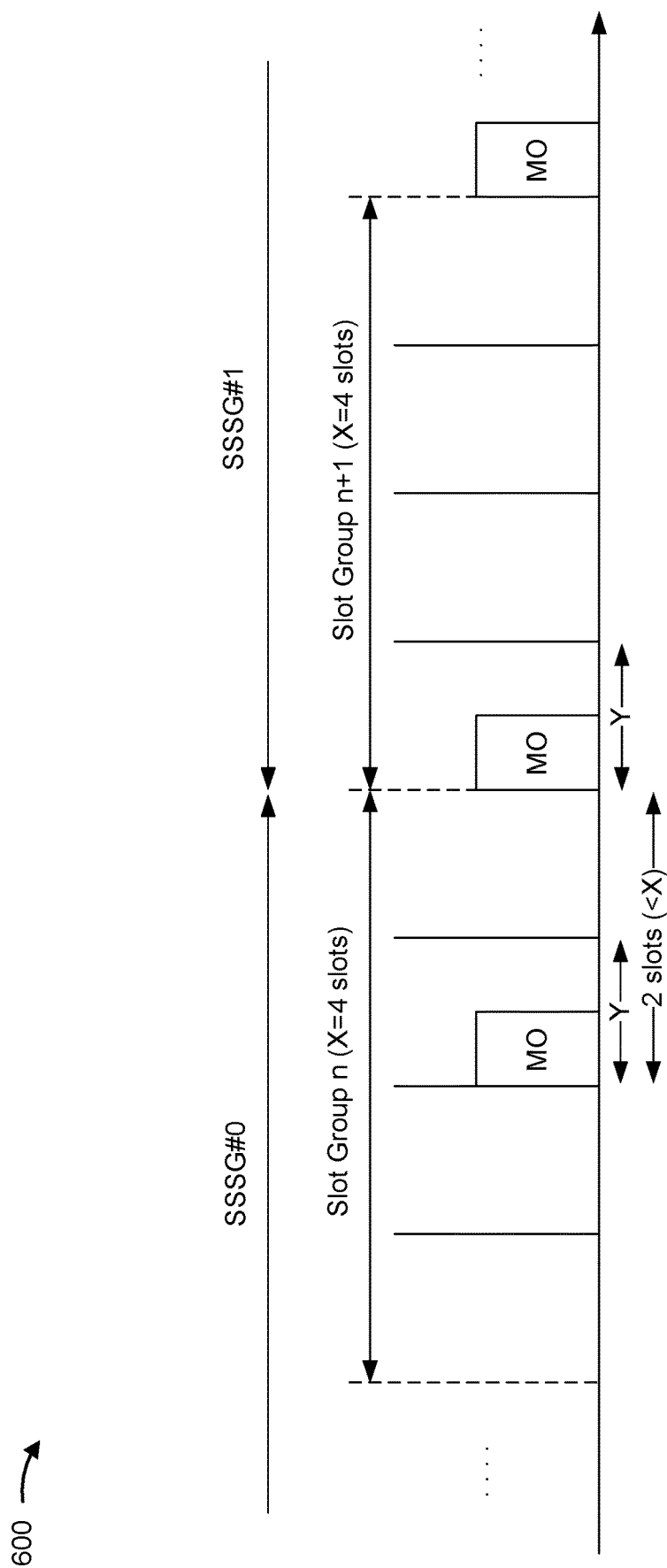
FIG. 6 is a diagram illustrating an example of search space set group (SSSG) switching, in accordance with the present disclosure.

FIG. 6 is a diagram illustrating an example 600 of search space set group switching, in accordance with the present disclosure.

In some cases, the UE 120 may perform search space set group (SSSG) switching. As described herein, an SSSG may be a group of one or more search space sets. In some cases (e.g., in an unlicensed band operation), the network node 110 may only start transmitting control information and data after acquiring the channel (e.g., via a listen-before-talk (LBT) procedure). To have more frequent channel access opportunities (e.g., instead of waiting for the next PDCCH occasion to start transmitting, and risk losing the medium), it may be desirable for the network node 110 to configure the UE 120 to perform more frequent control monitoring (e.g., more than once every slot group of X slots). Within a channel occupancy time (COT) (e.g., after LBT success), there may be no need for the UE 120 to continue frequent control monitoring, and the UE 120 may switch to sparse control monitoring (e.g., once per M (>1) slot groups) for power saving.

In some cases, multiple groups (e.g., two groups) of search space sets may be configured. For example, a search space set for the UE 120 may be associated with a first search space set group (SSSG #0) or a second search space set group (SSSG #1). In some cases, the search space sets associated with SSSG #0 may correspond to dense PDCCH MOs (i.e., short search space set periodicities) and may be used outside of the COT. In some cases, the search space sets associated with SSSG #1 may correspond to sparse PDCCH MOs (i.e., long search space set periodicities), and may be used within the COT. In some cases, switching mechanisms between SSSG #0 and SSSG #1 may be explicit (e.g., a bit in DCI format 2_0), or may be implicit (e.g., PDCCH decoding based), with the assistance of COT duration information and an automatic fallback timer.

In some cases, a switching boundary may be located between the first search space group (e.g., SSSG #0) and the second search space group (e.g., SSSG #1). In some cases, for multi-slot PDCCH monitoring, the SSSG switching boundary may be aligned with the slot group boundary. For example, after an SSSG switching indication (explicit or implicit), the new SSSG may start at the first slot group that is located at least a certain number of symbols (e.g., as indicated by $P_{switch}$) after the switching indication. $P_{switch}$ may be the switching delay that is RRC configured. In some cases, for multi-slot PDCCH monitoring, the SSSG switching boundary may be aligned with the slot boundary. For example, after the SSSG switching indication (explicit or implicit), the new SSSG may start at the first slot that is at least $P_{switch}$ symbols after the switching indication.

In some cases, the position of Y consecutive slots may be maintained across one or more groups of slots (slot groups) within the SSSG. However, the position of the Y consecutive slots (e.g., the monitoring span) may change at the boundary of the SSSG switching. As shown in the example 600, the slot group length may be four slots, and the monitoring span may be a single slot (e.g., (X, Y)=(4,1)). In the first search space set group (SSSG #0), the monitoring span may be located in the third slot of the slot group. In contrast, in the second search space set group (SSSG #2), the monitoring span may be located in the first slot of the slot group. Thus, the separation between the two monitoring spans is not at least X slots. This may result in the inability of the UE 120 to properly perform PDCCH monitoring during each of the monitoring spans (e.g., at each of the monitoring occasions). For example, the UE 120 may not be able to properly monitor and decode each of the PDCCH occasions (e.g., before an occurrence of a next PDCCH occasion), which may lead to some the information in the PDCCH being lost or not properly received by the UE 120.

Techniques and apparatuses are described herein for multi-slot PDCCH monitoring. In some aspects, a UE may receive an indication to perform PDCCH monitoring in a first monitoring span, of a first group of slots, and in a second monitoring span, of a second group of slots. The indication may indicate that a start of the first monitoring span should be at least a threshold number of slots away from the second monitoring span. For example, the indication may indicate that the start of the first monitoring span should be at least X slots from the start of the second monitoring span. In some aspects, the indication may indicate that a location of the first monitoring span, in the first group of slots, is the same as a location of the second monitoring span, in the second group of slots. In some aspects, the UE may drop one or more monitoring occasions, in the first monitoring span or the second monitoring span, based at least in part on the start of the first monitoring span being less than the threshold number of slots away from the start of the second monitoring span. In some aspects, the UE may adjust a boundary of the first SSSG, or a boundary of the second SSSG, such that the start of the first monitoring span and the start of the second monitoring span are separated by a number of slots that is greater than, or equal to, the threshold number of slots. The UE may selectively perform the PDCCH monitoring in the first monitoring span or the second monitoring span based at least in part on the indication.

In some cases, the first monitoring span and the second monitoring span may be less than a threshold number of slots (e.g., X slots) apart from each other. As described above, this may result in the inability of the UE to properly perform PDCCH monitoring at each of the monitoring occasions of the monitoring spans. Using the techniques and apparatuses described herein, the UE may be configured to selectively perform PDCCH monitoring based at least in part on the location of the monitoring spans. For example, the UE may receive an indication to only perform PDCCH monitoring if the monitoring spans are at least a threshold number (e.g., X) slots apart, or to drop one or more monitoring occasions, or adjust an SSSG switching boundary, if the monitoring spans are not at least the threshold number of slots apart. This may reduce the likelihood of another PDCCH occurrence (e.g., monitoring occasion) before the UE has had the opportunity to receive and properly obtain (e.g., decode) the information from the current PDCCH being monitored.

As indicated above, FIG. 6 is provided as an example. Other examples may differ from what is described with respect to FIG. 6.

Figure 7:
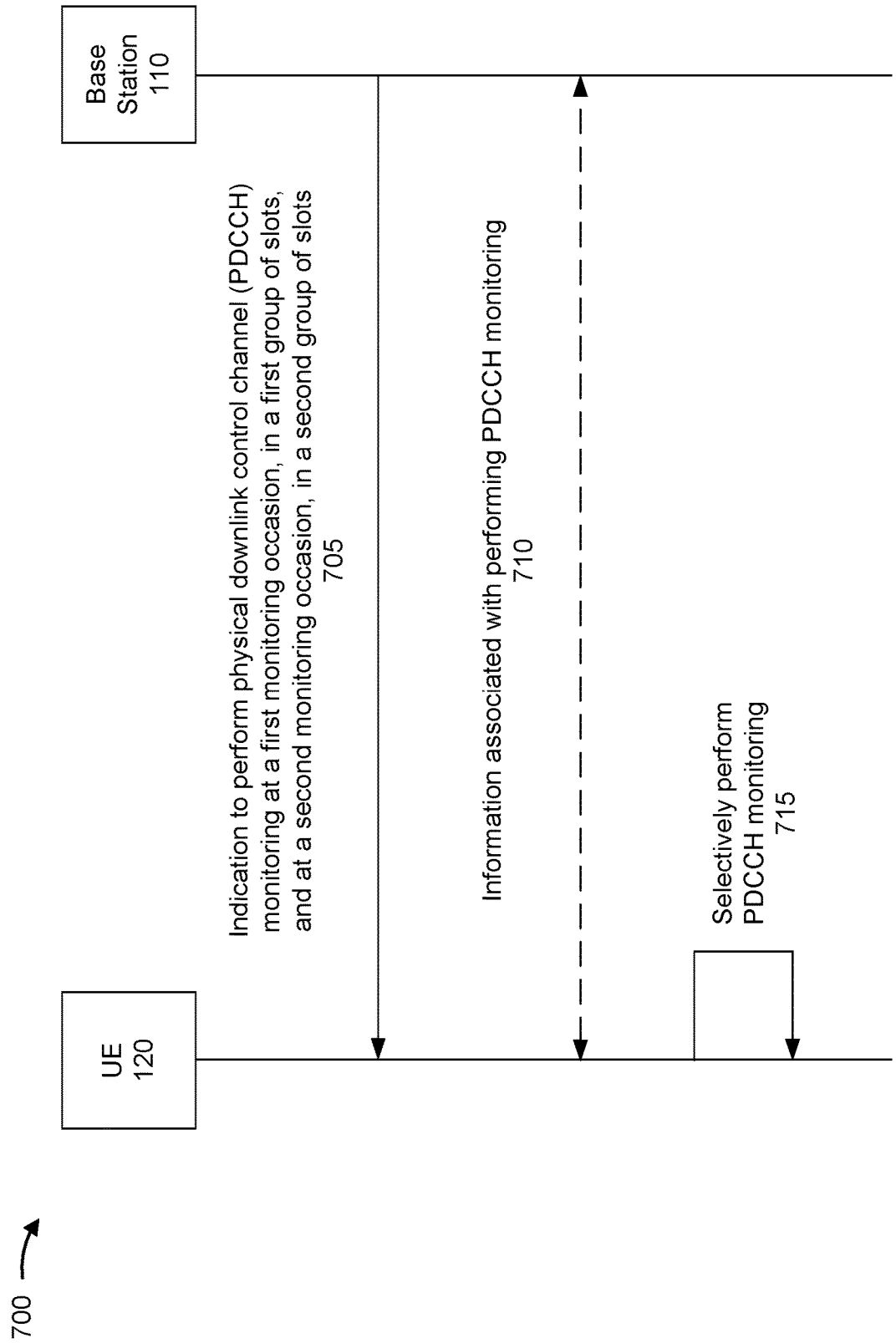
FIG. 7 is a diagram illustrating an example associated with multi-slot PDCCH monitoring, in accordance with the present disclosure.

FIG. 7 is a diagram illustrating an example 700 of multi-slot PDCCH monitoring, in accordance with the present disclosure. A UE, such as the UE 120, may communicate with a network node, such as the network node 110.

As shown in connection with reference number 705, the network node 110 may transmit, and the UE 120 may receive, an indication to perform PDCCH monitoring at a first monitoring span, of a first group of slots, and at a second monitoring span, of a second group of slots. The indication may indicate that a start of the first monitoring span should be at least a threshold number of slots away from a start of the second monitoring span. For example, the network node 110 may transmit an indication for the UE 120 to perform PDCCH monitoring at one or more monitoring occasions of the first monitoring span (in the first group of slots), and at one or more monitoring occasions of the second monitoring span (in the second group of slots), wherein the second monitoring span is at least X slots away from the first monitoring span. As described herein, the variable X (e.g., the threshold number of slots) may correspond to the length of the slot group. For example, the UE 120 may be configured to perform PDCCH monitoring every X slots of a sub-frame. The variable Y may correspond to the monitoring span, which may be the number of consecutive slots with monitoring occasions within the slot group.

As shown in connection with reference number 710, the network node 110 and the UE 120 may communicate information associated with the UE 120 performing the PDCCH monitoring. In some aspects, the information may be received as part of the indication to perform the PDCCH monitoring (as described in connection with reference number 705). In some aspects, the information may be received separately from the indication to perform the PDCCH monitoring.

In some aspects, the information may include PDCCH monitoring restriction information. The information may indicate that a location of a monitoring span, in the first group of slots, should be the same as a location of a monitoring span, in the second group of slots. Thus, the first monitoring span may be at least the threshold number of slots away from the second monitoring span. Additional details regarding the PDCCH monitoring restriction information are described below in connection with FIGS. 8A and 8B.

In some aspects, the information may include monitoring span rule dropping information. In some aspects, the UE 120 may be configured to drop all monitoring occasions of a group of slots. For example, the UE 120 may be configured to drop all monitoring occasions of a group of slots if the start of the monitoring span (e.g., the initial monitoring occasion of the monitoring span) of the group of slots is not at least the threshold number of slots away from the start of the monitoring span of another group of slots (e.g., a previous group of slots). In some aspects, the UE 120 may be configured to drop individual monitoring occasions of a group of slots such that the start of a monitoring span is at least a threshold number of slots away from the start of another (e.g., a previous) monitoring span. Additional details regarding the monitoring span rule dropping information are described below in connection with FIGS. 9A and 9B.

In some aspects, the information may include SSSG switching boundary adjustment information. The UE 120 may determine that a monitoring span of a first group of slots (associated with SSSG #0) is not at least the threshold number of slots away from a monitoring span of a second group of slots (associated with SSSG #1). The UE 120 may be configured to adjust the SSSG switching boundary such that the monitoring span associated with SSSG #0 is at least the threshold number of slots away from the monitoring span associated with SSSG #1. Additional details regarding the SSSG switching boundary adjustment information are described below in connection with FIGS. 10A and 10B.

As shown in connection with reference number 715, the UE 120 may selectively perform PDCCH monitoring. In some aspects, as described above, the UE 120 may perform the PDCCH monitoring at one or more monitoring occasions in a group of slots. In an example (as described in FIGS. 8A and 8B), the UE 120 may perform the PDCCH monitoring at the monitoring occasion in the first group of slots and at the monitoring occasion in the second group of slots, as long as the monitoring span in the first group of slots has the same location as the monitoring span in the second group of slots. In another example (as described in FIGS. 9A and 9B), the UE 120 may drop one or more monitoring occasions of a monitoring span if the monitoring span is not at least a threshold number of slots away from another monitoring span, and may perform the PDCCH monitoring in one or more remaining monitoring occasions. In another example (as described in FIGS. 10A and 10B), the UE 120 may adjust an SSSG switching boundary such that the monitoring span associated with the SSSG is at least the threshold number of slots away from the monitoring span associated with another SSSG.

As described above, the first monitoring span and the second monitoring span may be less than a threshold number of slots (e.g., X slots) apart from each other. This may result in the inability of the UE 120 to properly perform PDCCH monitoring at each of the monitoring occasions within the monitoring spans. Using the techniques and apparatuses described herein, the UE 120 may be configured to selectively perform PDCCH monitoring based at least in part on the location of the monitoring spans. For example, the UE 120 may receive an indication to only perform PDCCH monitoring if the monitoring spans are at least a threshold number (e.g., X) slots apart, or to drop one or more monitoring occasions, or adjust an SSSG switching boundary, if the monitoring spans are not at least the threshold number of slots apart. This may reduce the likelihood of another PDCCH occurrence (e.g., monitoring occasion) before the UE 120 has had the opportunity to receive and properly obtain (e.g., decode) the information from the current PDCCH being monitored.

As indicated above, FIG. 7 is provided as an example. Other examples may differ from what is described with respect to FIG. 7.

Figure 8A:
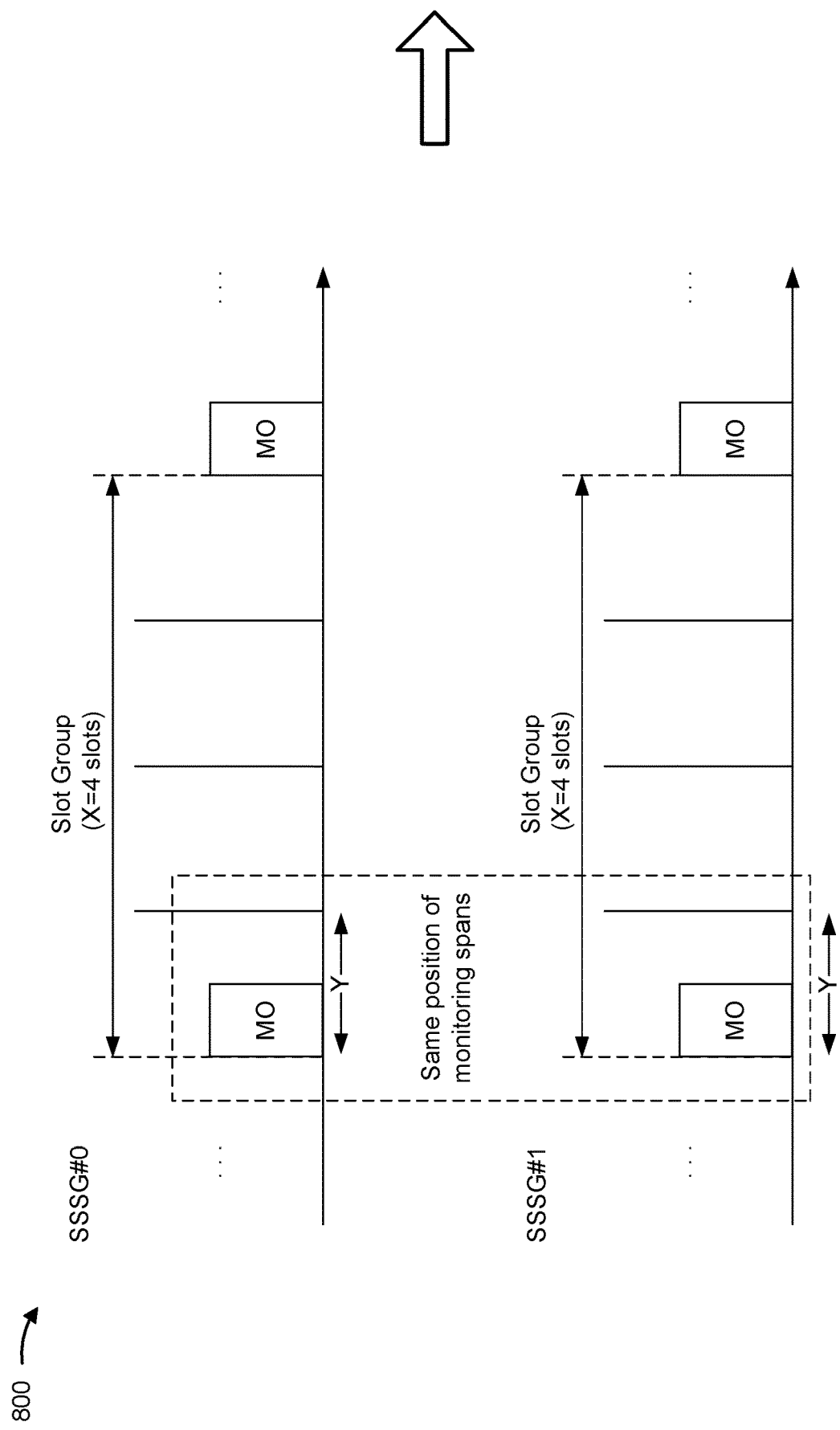
FIGS. 8A and 8B are diagrams illustrating an example associated with PDCCH monitoring restriction, in accordance with the present disclosure.
Figure 8B:
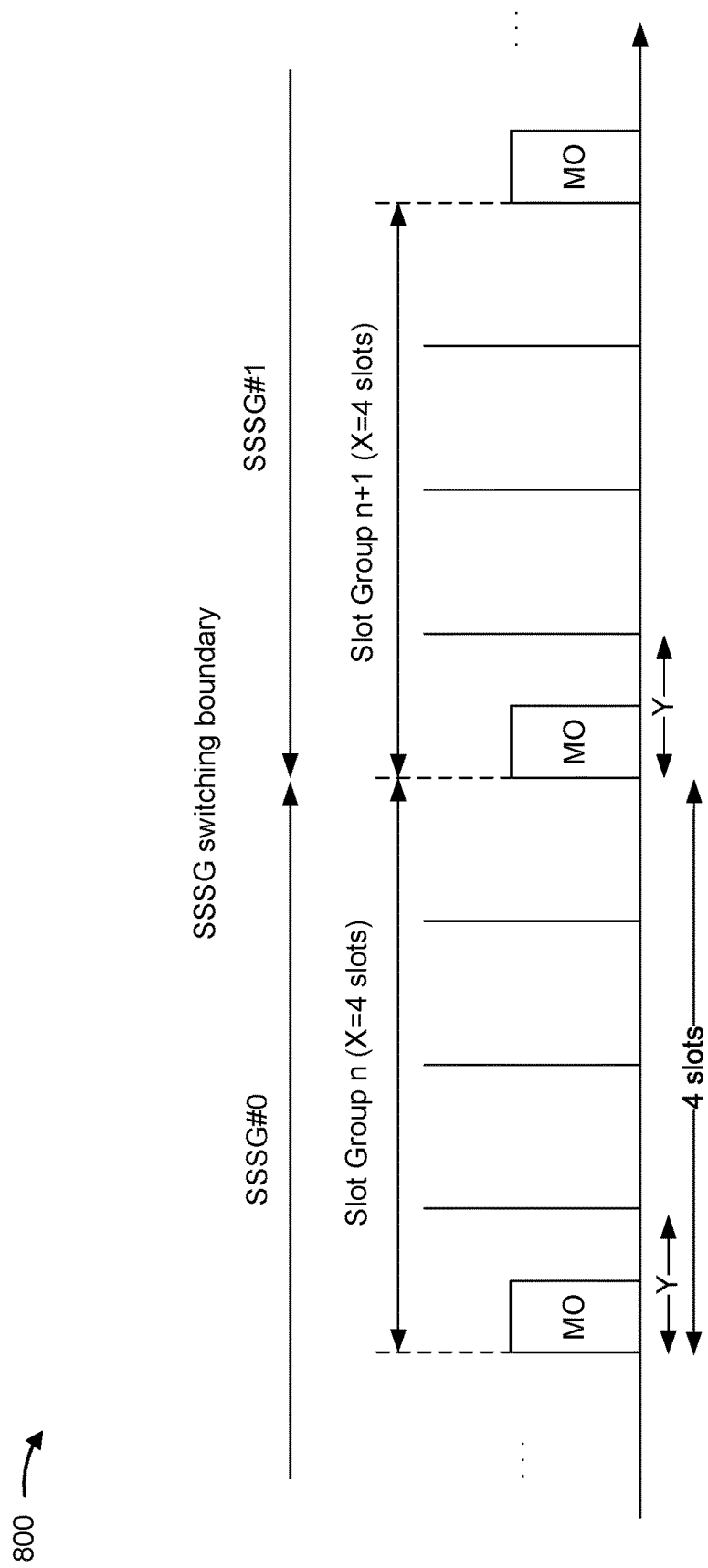

FIGS. 8A and 8B are diagrams illustrating an example 800 of PDCCH monitoring restriction, in accordance with the present disclosure.

As described above in connection with reference number 710 of example 700, the network node 110 may transmit, and the UE 120 may receive, information associated with the UE 120 performing the PDCCH monitoring. In some aspects, the information (e.g., configuration information) may indicate that a location of a monitoring span, in the first group of slots, should be the same as a location of a monitoring span, in the second group of slots. Thus, the PDCCH monitoring occasions of all search space sets may be restricted to fall into the same monitoring span (e.g., consecutive Y slots). In this example, the variable X may be four slots and the variable Y may be one slot (e.g., (X, Y)=(4,1)).

In some aspects, the information may indicate that the first monitoring span should be located at a particular slot, of the first group of slots, and the second monitoring span should be located at the particular slot, of the second group of slots. For example, the particular slot of the first group of slots may be the first slot of the first group of slots, and the particular slot of the second group of slots may be the first slot of the second group of slots. In another example, the particular slot of the first group of slots may be the third slot of the first group of slots, and the particular slot of the second group of slots may be the third slot of the second group of slots.

As shown in the example 800, the information may indicate that a first monitoring span should be located at the first slot, of the first group of slots, and that a second monitoring span should be located at the first slot, of the second group of slots. Thus, the first monitoring span will be at least the threshold number of slots away from the second monitoring span. For example, at the SSSG switching boundary, the start of the monitoring span of the first group of slots (associated with SSSG #0) may be at least X slots (e.g., 4 slots) away from the start of the monitoring span of the second group of slots (associated with SSSG #1).

As indicated above, FIGS. 8A and 8B are provided as examples. Other examples may differ from what is described with respect to FIGS. 8A and 8B.

Figure 9A:
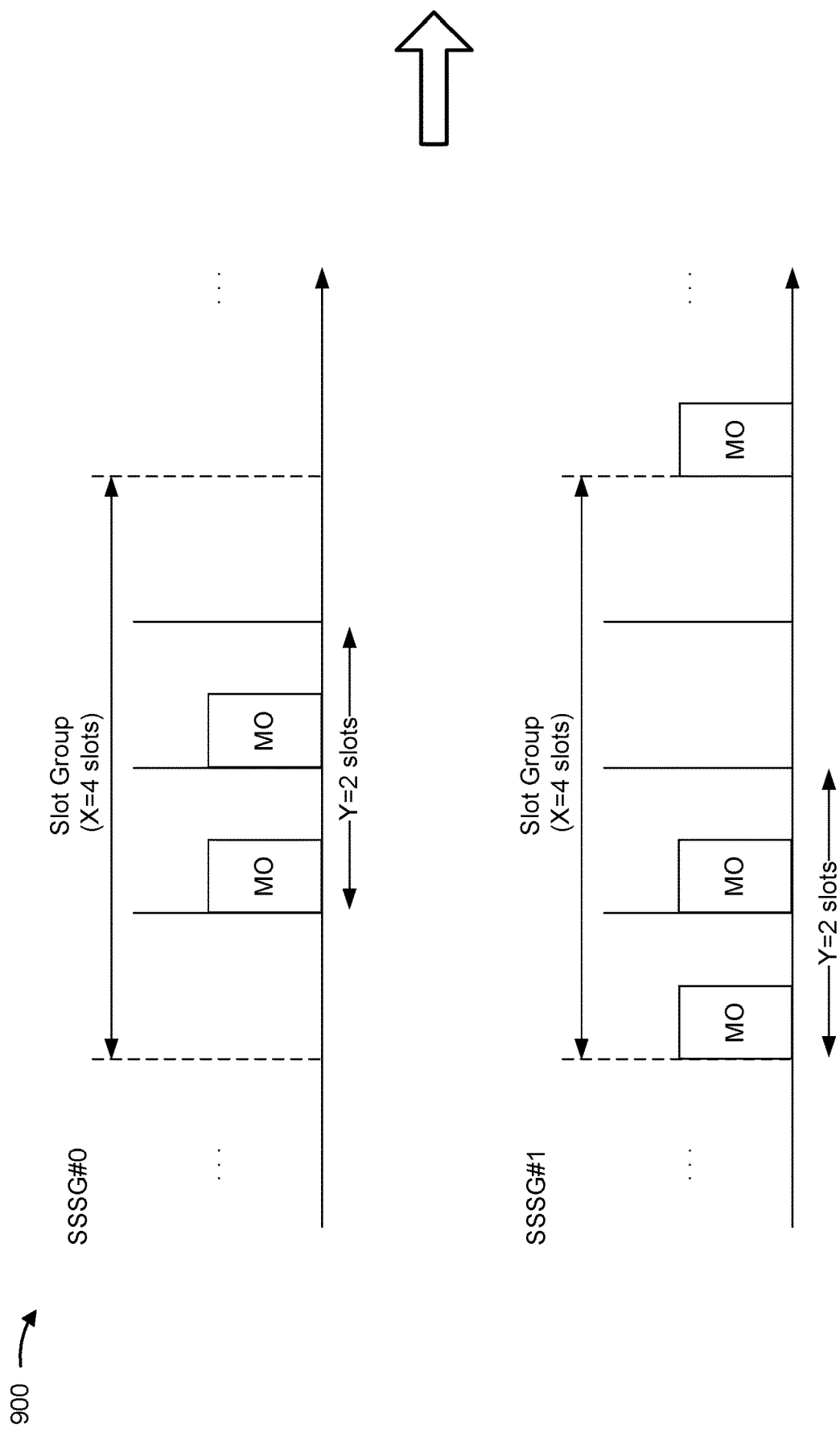
FIGS. 9A and 9B are diagrams illustrating an example associated with monitoring span rule dropping, in accordance with the present disclosure.
Figure 9B:
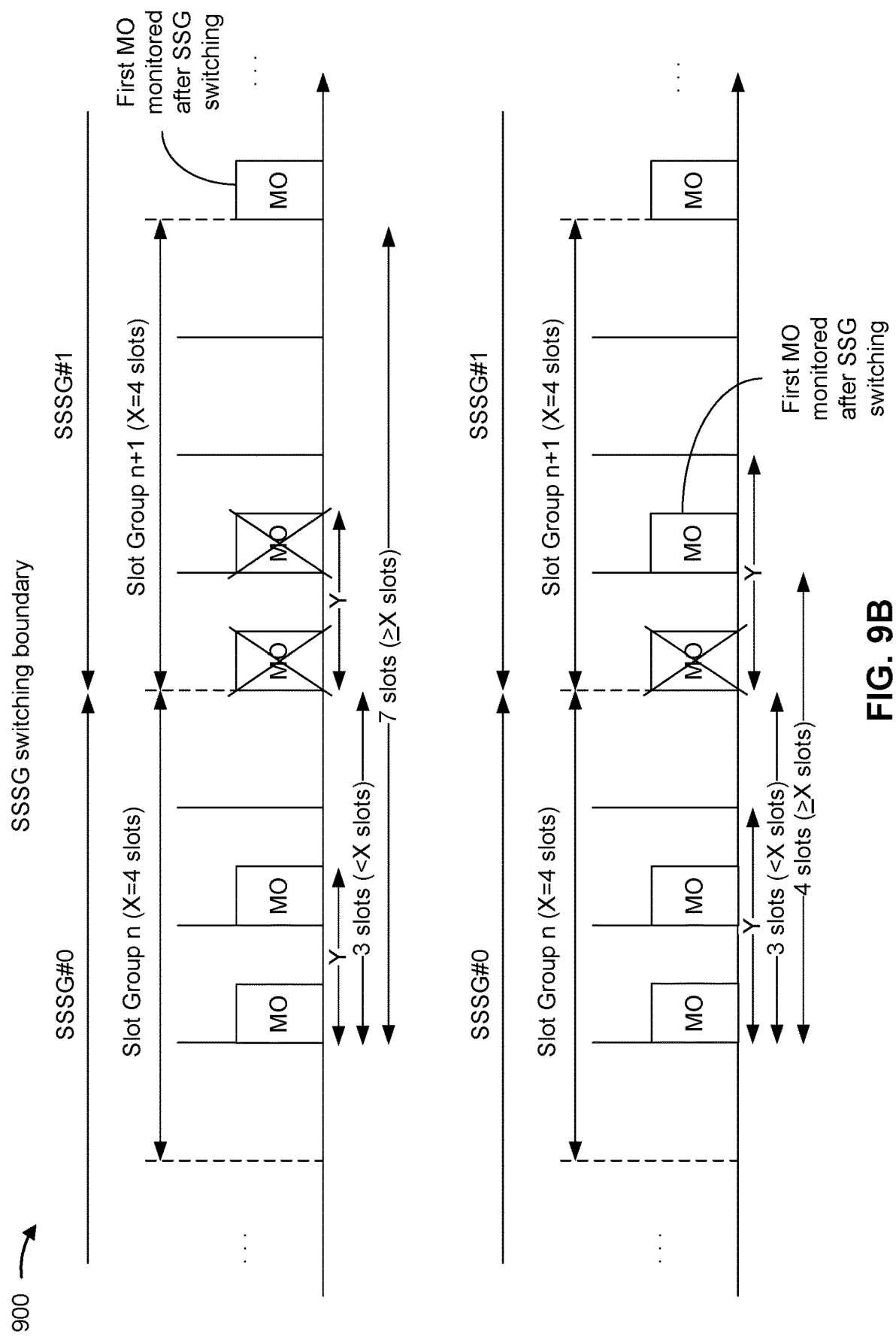

FIGS. 9A and 9B are diagrams illustrating an example 900 of monitoring span rule dropping, in accordance with the present disclosure.

As described above in connection with reference number 710 of example 700, the network node 110 may transmit, and the UE 120 may receive, information associated with the UE 120 performing the PDCCH monitoring. In some aspects, the information may indicate for the UE 120 to drop one or more monitoring occasions of a monitoring span if the monitoring span is not at least X slots away from another monitoring span (e.g., a previous monitoring span) in the subframe. In this example, the variable X may be four slots and the variable Y may be two slots (e.g., (X, Y)=(4,2)). Also, in this example, the SSSG switching boundary may be aligned with the slot group boundary.

As shown in the example 900, the first group of slots associated with SSSG #0 may include a monitoring span (e.g., two monitoring occasions) at the second slot and the third slot of the group of slots. The second group of slots associated with SSSG #1 may include a monitoring span (e.g., two monitoring occasions) at the first slot and the second slot of the group of slots. The start of the monitoring span of the first group of slots (e.g., the second slot, of the first group of slots) may not be at least four slots away from the start of the monitoring span of the second group of slots (e.g., the first slot, of the second group of slots). Instead, the monitoring span of the first group of slots may only be three slots away from the monitoring span of the second group of slots.

In some aspects, the UE 120 may be configured to drop all monitoring occasions of a group of slots. For example, the UE 120 may be configured to drop all monitoring occasions of a group of slots if the start of the monitoring span (e.g., the initial monitoring occasion of the monitoring span) of the group of slots is not at least the threshold number of slots away from the start of the monitoring span of another group of slots (e.g., a previous group of slots). In this example, the UE 120 may determine that the first slot, of the second group of slots, is not at least four slots away from the second slot, of the first group of slots. Thus, the UE 120 may drop the entire monitoring span of the second group of slots (e.g., the monitoring occasion at the first slot of the second group of slots, and the monitoring occasion at the second slot of the second group of slots). The UE 120 may perform PDCCH monitoring at the next monitoring occasion, which may be associated with a third group of slots.

In some aspects, the UE 120 may be configured to drop individual monitoring occasions of a group of slots. For example, the UE 120 may be configured to drop a monitoring occasion, of a group of slots, if the start of the monitoring span that includes the monitoring occasion is not at least the threshold number of slots away from the start of another monitoring span associated with another group of slots (e.g., a previous group of slots). In this example, the UE 120 may determine that the first slot of the second group of slots (e.g., the start of the second monitoring span), is not at least four slots away from the second slot of the first group of slots (e.g., the start of the first monitoring span). Thus, the UE 120 may drop the first slot of the second group of slots. The UE 120 may not drop the second slot of the second group of slots, since the second slot of the second group of slots is four slots away from the second slot of the first group of slots. Thus, the UE 120 may perform PDCCH monitoring at the second slot of the second group of slots.

As indicated above, FIGS. 9A and 9B are provided as examples. Other examples may differ from what is described with respect to FIGS. 9A and 9B.

Figure 10A:
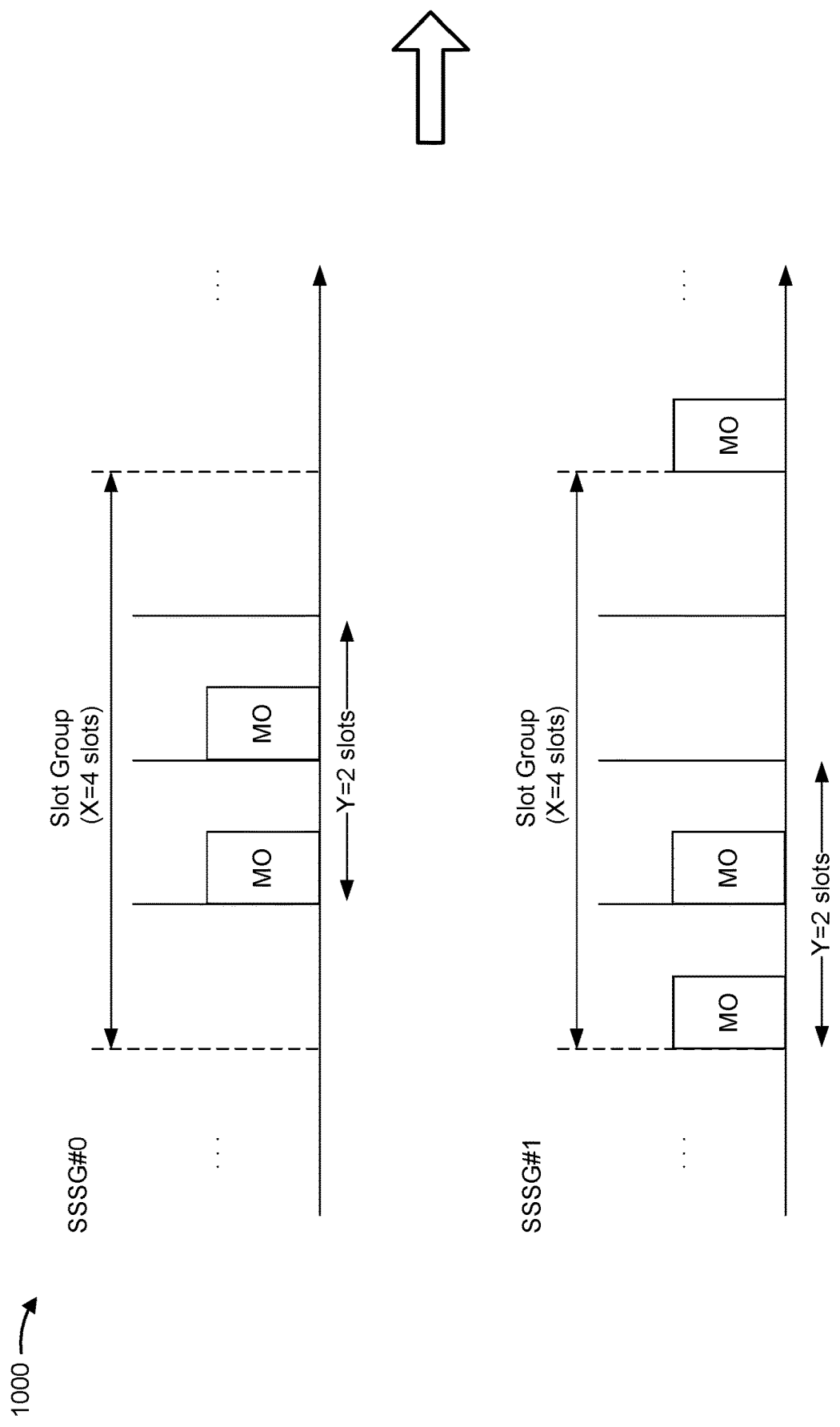
FIGS. 10A and 10B are diagrams illustrating an example associated with SSSG switching boundary adjustment, in accordance with the present disclosure.
Figure 10B:
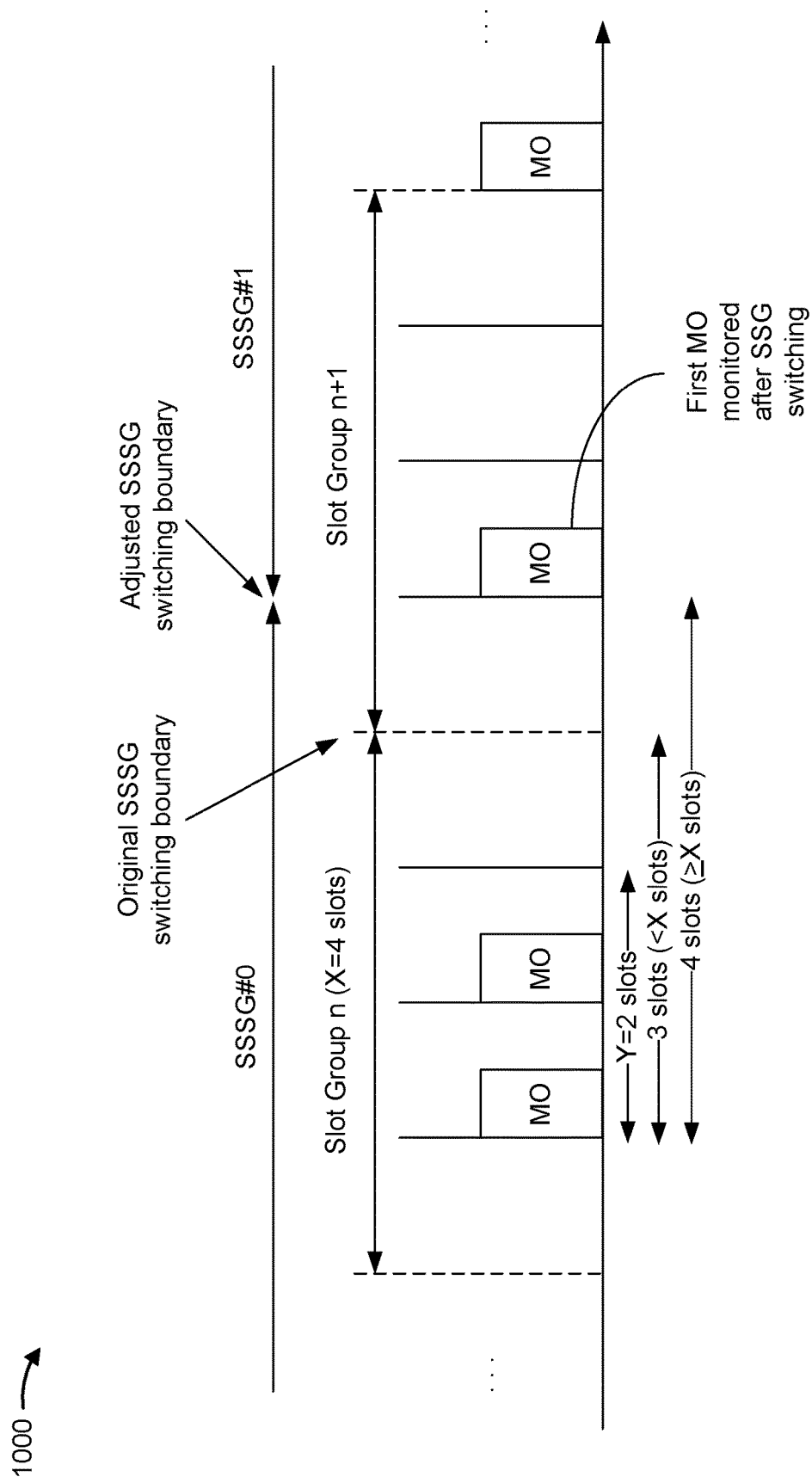

FIGS. 10A and 10B are diagrams illustrating an example 1000 of SSSG switching boundary adjustment, in accordance with the present disclosure.

As described above in connection with reference number 710 of example 700, the network node 110 may transmit, and the UE 120 may receive, information associated with the UE 120 performing the PDCCH monitoring. In some aspects, the information may indicate for the UE 120 to adjust an SSSG switching boundary. In this example, the variable X may be four slots and the variable Y may be two slots (e.g., (X, Y)=(4,2)).

As shown in the example 1000, the first group of slots associated with SSSG #0 may include a first monitoring span having monitoring occasions at the second slot and the third slot of the group of slots. The second group of slots associated with SSSG #1 may include a second monitoring span having monitoring occasions at the first slot and the second slot of the group of slots. Thus, the start of the first monitoring span may not be at least four slots away from the start of the second monitoring span. Instead, the start of the first monitoring span may only be three slots away from the start of the second monitoring span.

In some aspects, the UE 120 may be configured to adjust one or more SSSG switching boundaries. For example, the UE 120 may determine that the start of the first monitoring span, associated with SSSG #0, is not at least the threshold number of slots away from the start of the second monitoring span, associated with SSSG #1. The UE 120 may be configured to adjust the SSSG switching boundary such that the start of the monitoring span associated with SSSG #0 is at least the threshold number of slots away from the start of the monitoring span associated with SSSG #1. For example, the UE 120 may adjust the monitoring span of SSSG #1 such that the first monitoring occasion of SSSG #1 occurs at the second slot of the second group of slots. Thus, the monitoring span associated with SSSG #1 may include only the monitoring occasion at the second slot of the second group of slots.

In some aspects, the UE 120 may be configured to perform one or more of the following in order to adjust the SSSG switching boundaries. In a first step, the UE 120 may be configured to determine the SSSG switching boundary based at least in part on a legacy rule. For example, the UE 120 may be configured to determine the SSSG switching boundary based at least in part on $P_{switch}$ (as described herein). The SSSG switching boundary may be aligned with the slot group boundary, or with an individual slot boundary. In a second step, the UE 120 may be configured to identify the position (e.g., location) of the last monitoring span before the SSSG switching boundary. In a third step, if the position of the last monitoring span is less than X slots away from the SSSG switching boundary, the UE 120 may be configured to adjust (e.g., push) the switching boundary to a slot boundary that is at least X slots away from the start of the monitoring span.

As indicated above, FIGS. 10A and 10B are provided as examples. Other examples may differ from what is described with respect to FIGS. 10A and 10B.

Figure 11:
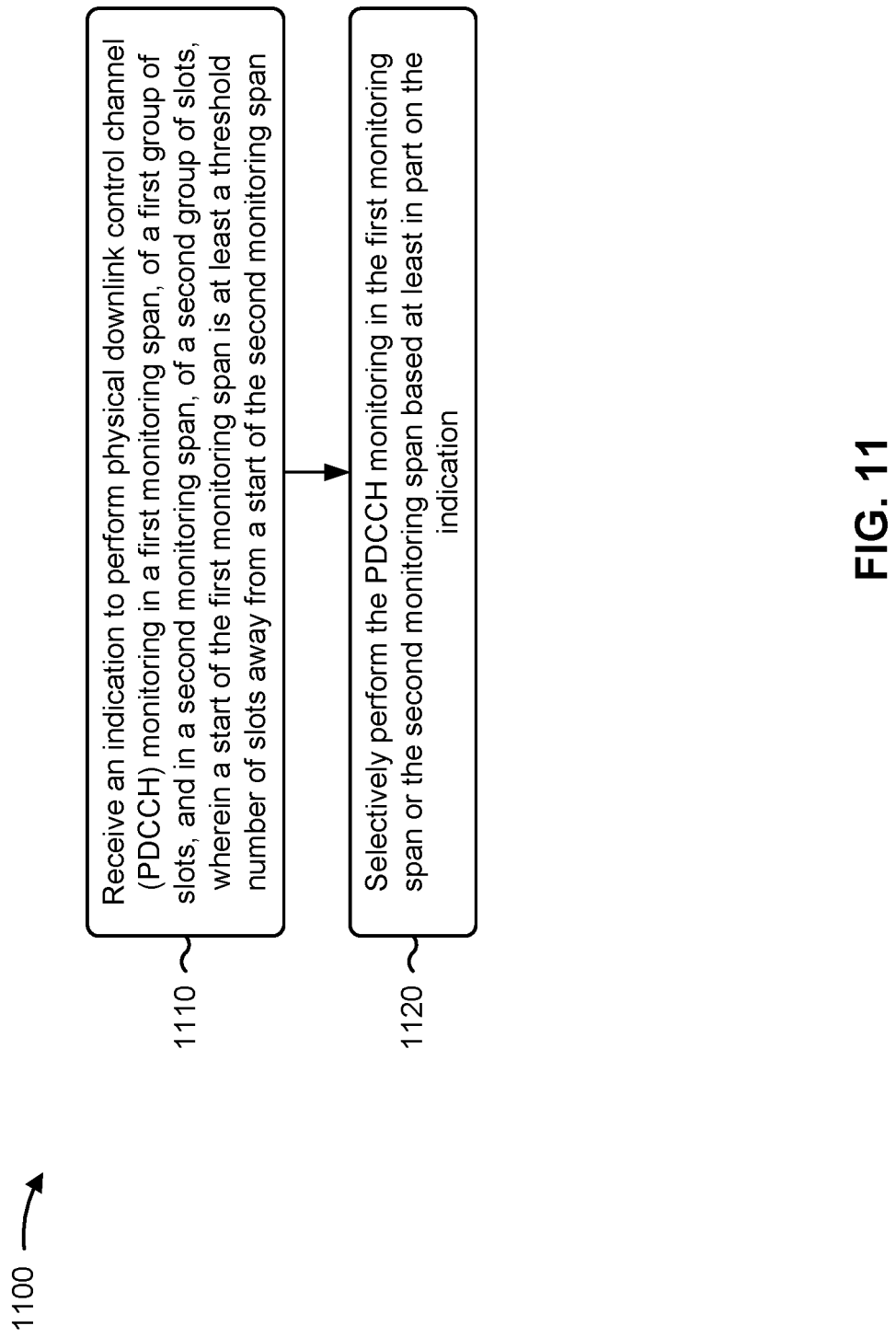
FIG. 11 is a diagram illustrating an example process associated with multi-slot PDCCH monitoring, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with multi-slot PDCCH monitoring.

As shown in FIG. 11, in some aspects, process 1100 may include receiving an indication to perform PDCCH monitoring in a first monitoring span, of a first group of slots, and in a second monitoring span, of a second group of slots, wherein a start of the first monitoring span is at least a threshold number of slots away from a start of the second monitoring span (block 1110). For example, the UE (e.g., using communication manager 140 and/or reception component 1302, depicted in FIG. 13) may receive an indication to perform PDCCH monitoring in a first monitoring span, of a first group of slots, and in a second monitoring span, of a second group of slots, wherein a start of the first monitoring span is at least a threshold number of slots away from a start of the second monitoring span, as described above.

As further shown in FIG. 11, in some aspects, process 1100 may include selectively performing the PDCCH monitoring in the first monitoring span or the second monitoring span based at least in part on the indication (block 1120). For example, the UE (e.g., using communication manager 140 and/or monitoring component 1308, depicted in FIG. 13) may selectively perform the PDCCH monitoring in the first monitoring span or the second monitoring span based at least in part on the indication, as described above.

Process 1100 may include additional aspects, such as any single aspect or any combination of aspects described below and/or in connection with one or more other processes described elsewhere herein.

In a first aspect, the indication indicates that a location of the first monitoring span, in the first group of slots, is the same as a location of the second monitoring span, in the second group of slots.

In a second aspect, alone or in combination with the first aspect, each of the first monitoring span and the second monitoring span include a number of monitoring occasions, each of the monitoring occasions having a duration that is less than a duration of a slot.

In a third aspect, alone or in combination with one or more of the first and second aspects, the number of monitoring occasions in the first monitoring span is equal to the number of monitoring occasions in the second monitoring span.

In a fourth aspect, alone or in combination with one or more of the first through third aspects, selectively performing the PDCCH monitoring in the first monitoring span or the second monitoring span comprises performing the PDCCH monitoring in the first monitoring span and the second monitoring span based at least in part on determining that the start of the first monitoring span and the start of the second monitoring span are separated by a number of slots that is greater than, or equal to, the threshold number of slots.

In a fifth aspect, alone or in combination with one or more of the first through fourth aspects, the first group of slots is associated with a first SSSG, and the second group of slots is associated with a second SSSG, wherein a switching boundary between the first SSSG and the second SSSG is aligned with a boundary between the first group of slots and the second group of slots.

In a sixth aspect, alone or in combination with one or more of the first through fifth aspects, process 1100 includes determining that the start of the first monitoring span is less than the threshold number of slots away from the start of the second monitoring span.

In a seventh aspect, alone or in combination with one or more of the first through sixth aspects, process 1100 includes dropping a monitoring occasion, in the first monitoring span or the second monitoring span, based at least in part on the start of the first monitoring span being less than the threshold number of slots away from the start of the second monitoring span.

In an eighth aspect, alone or in combination with one or more of the first through seventh aspects, process 1100 includes dropping all monitoring occasions, in the first monitoring span or the second monitoring span, based at least in part on the start of the first monitoring span being less than the threshold number of slots away from the start of the second monitoring span.

In a ninth aspect, alone or in combination with one or more of the first through eighth aspects, selectively performing the PDCCH monitoring in the first monitoring span or the second monitoring span comprises determining not to perform the PDCCH monitoring in the first monitoring span or the second monitoring span based at least in part on the start of the first monitoring span being less than the threshold number of slots away from the start of the second monitoring span.

In a tenth aspect, alone or in combination with one or more of the first through ninth aspects, process 1100 includes adjusting a boundary of the first SSSG, or a boundary of the second SSSG, such that the start of the first monitoring span and the start of the second monitoring span are separated by a number of slots that is greater than, or equal to, the threshold number of slots.

In an eleventh aspect, alone or in combination with one or more of the first through tenth aspects, selectively performing the PDCCH monitoring in the first monitoring span or the second monitoring span comprises performing the PDCCH monitoring in the first monitoring span and the second monitoring span based at least in part on the adjusted boundary of the first SSSG or the adjusted boundary of the second SSSG.

In a twelfth aspect, alone or in combination with one or more of the first through eleventh aspects, process 1100 includes identifying a location of the start of the first monitoring span, determining that the location of the start of the first monitoring span is less than the threshold number of slots away from the switching boundary, and adjusting the boundary of the first SSSG based at least in part on the determining that the location of the start of the first monitoring span is less than the threshold number of slots away from the switching boundary.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
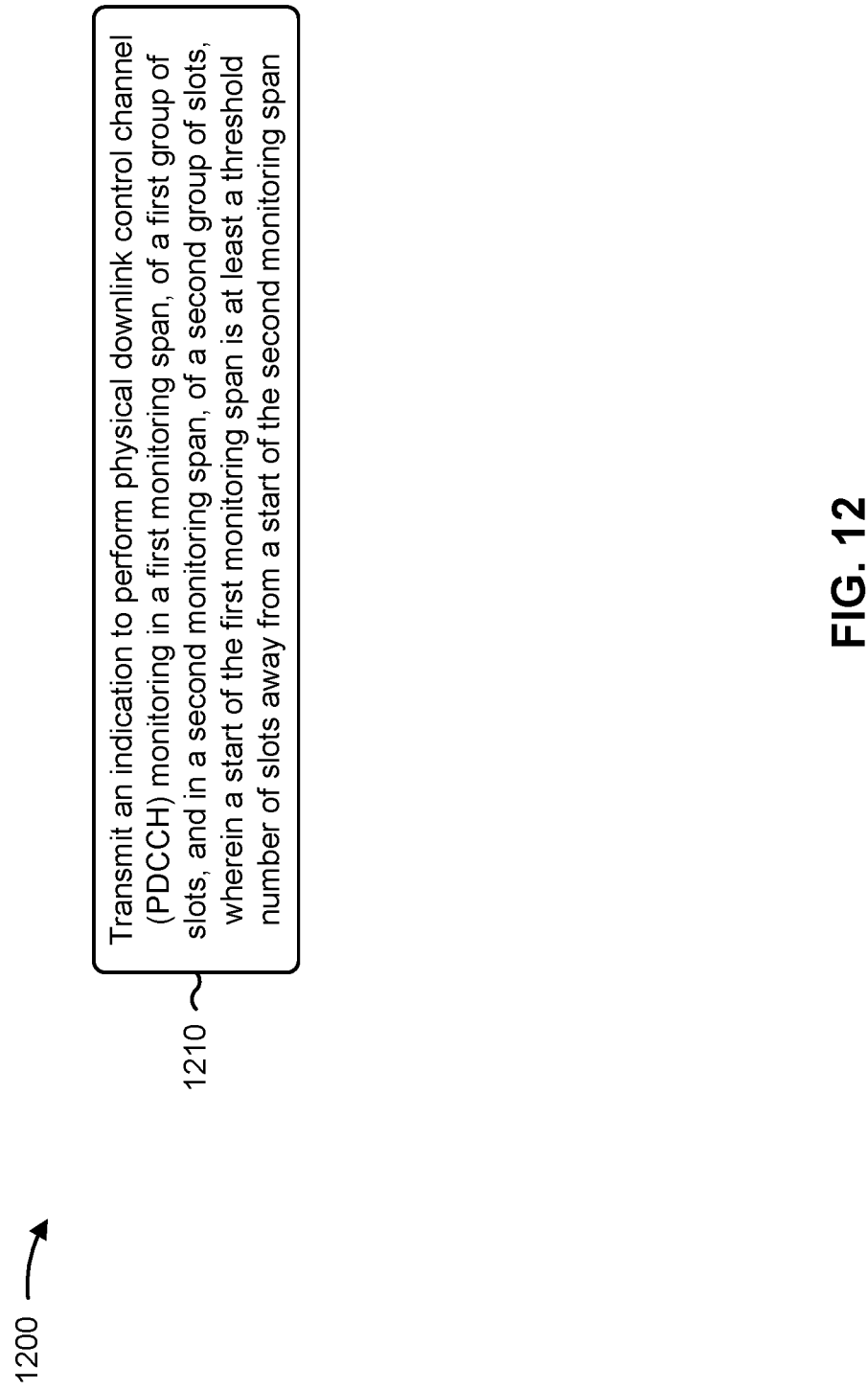
FIG. 12 is a diagram illustrating an example process associated with multi-slot PDCCH monitoring, in accordance with the present disclosure.

FIG. 12 is a diagram illustrating an example process 1200 performed, for example, by a network node, in accordance with the present disclosure. Example process 1200 is an example where the network node (e.g., network node 110) performs operations associated with multi-slot PDCCH monitoring.

As shown in FIG. 12, in some aspects, process 1200 may include transmitting an indication to perform PDCCH monitoring in a first monitoring span, of a first group of slots, and in a second monitoring span, of a second group of slots, wherein a start of the first monitoring span is at least a threshold number of slots away from a start of the second monitoring span (block 1210). For example, the network node (e.g., using communication manager 150 and/or transmission component 1404, depicted in FIG. 14) may transmit an indication to perform PDCCH monitoring in a first monitoring span, of a first group of slots, and in a second monitoring span, of a second group of slots, wherein a start of the first monitoring span is at least a threshold number of slots away from a start of the second monitoring span, as described above.

Process 1200 may include additional aspects, such as any single aspect or any combination of aspects described below and/or in connection with one or more other processes described elsewhere herein.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
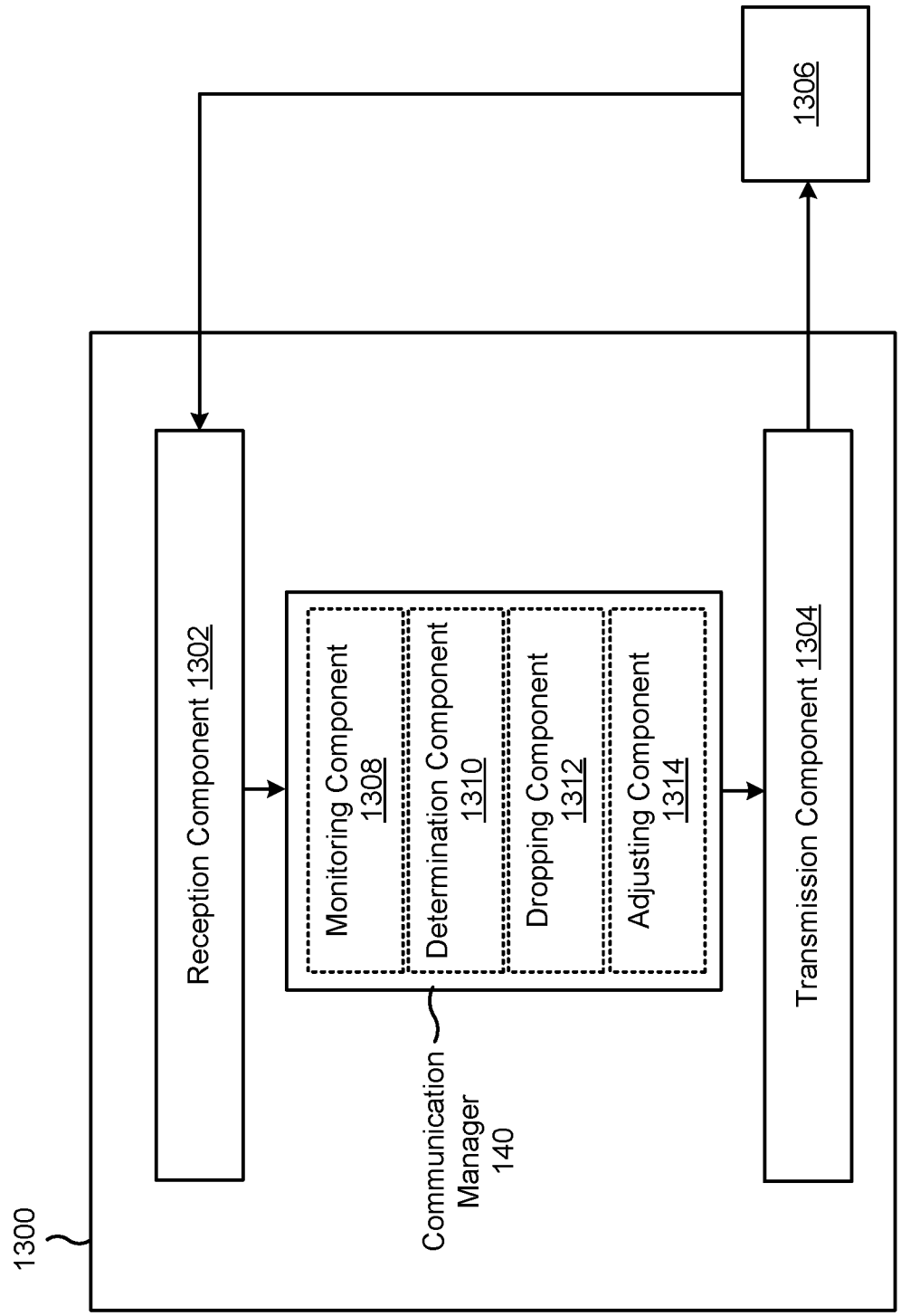
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a network node, or another wireless communication device) using the reception component 1302 and the transmission component 1304. As further shown, the apparatus 1300 may include the communication manager 140. The communication manager 140 may include one or more of a monitoring component 1308, a determination component 1310, a dropping component 1312, or an adjusting component 1314, among other examples.

In some aspects, the apparatus 1300 may be configured to perform one or more operations described herein in connection with FIGS. 7-10. Additionally, or alternatively, the apparatus 1300 may be configured to perform one or more processes described herein, such as process 11 of FIG. 11 In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive an indication to perform PDCCH monitoring in a first monitoring span, of a first group of slots, and in a second monitoring span, of a second group of slots, wherein a start of the first monitoring span is at least a threshold number of slots away from a start of the second monitoring span. The monitoring component 1308 may selectively perform the PDCCH monitoring in the first monitoring span or the second monitoring span based at least in part on the indication.

The determination component 1310 may determine that the start of the first monitoring span is less than the threshold number of slots away from the start of the second monitoring span.

The dropping component 1312 may drop a monitoring occasion, in the first monitoring span or the second monitoring span, based at least in part on the start of the first monitoring span being less than the threshold number of slots away from the start of the second monitoring span.

The dropping component 1312 may drop all monitoring occasions, in the first monitoring span or the second monitoring span, based at least in part on the start of the first monitoring span being less than the threshold number of slots away from the start of the second monitoring span.

The adjusting component 1314 may adjust a boundary of the first SSSG, or a boundary of the second SSSG, such that the start of the first monitoring span and the start of the second monitoring span are separated by a number of slots that is greater than, or equal to, the threshold number of slots.

The determination component 1310 may identify a location of the start of the first monitoring span. The determination component 1310 may determine that the location of the start of the first monitoring span is less than the threshold number of slots away from the switching boundary. The adjusting component 1314 may adjust the boundary of the first SSSG based at least in part on the determining that the location of the start of the first monitoring span is less than the threshold number of slots away from the switching boundary.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
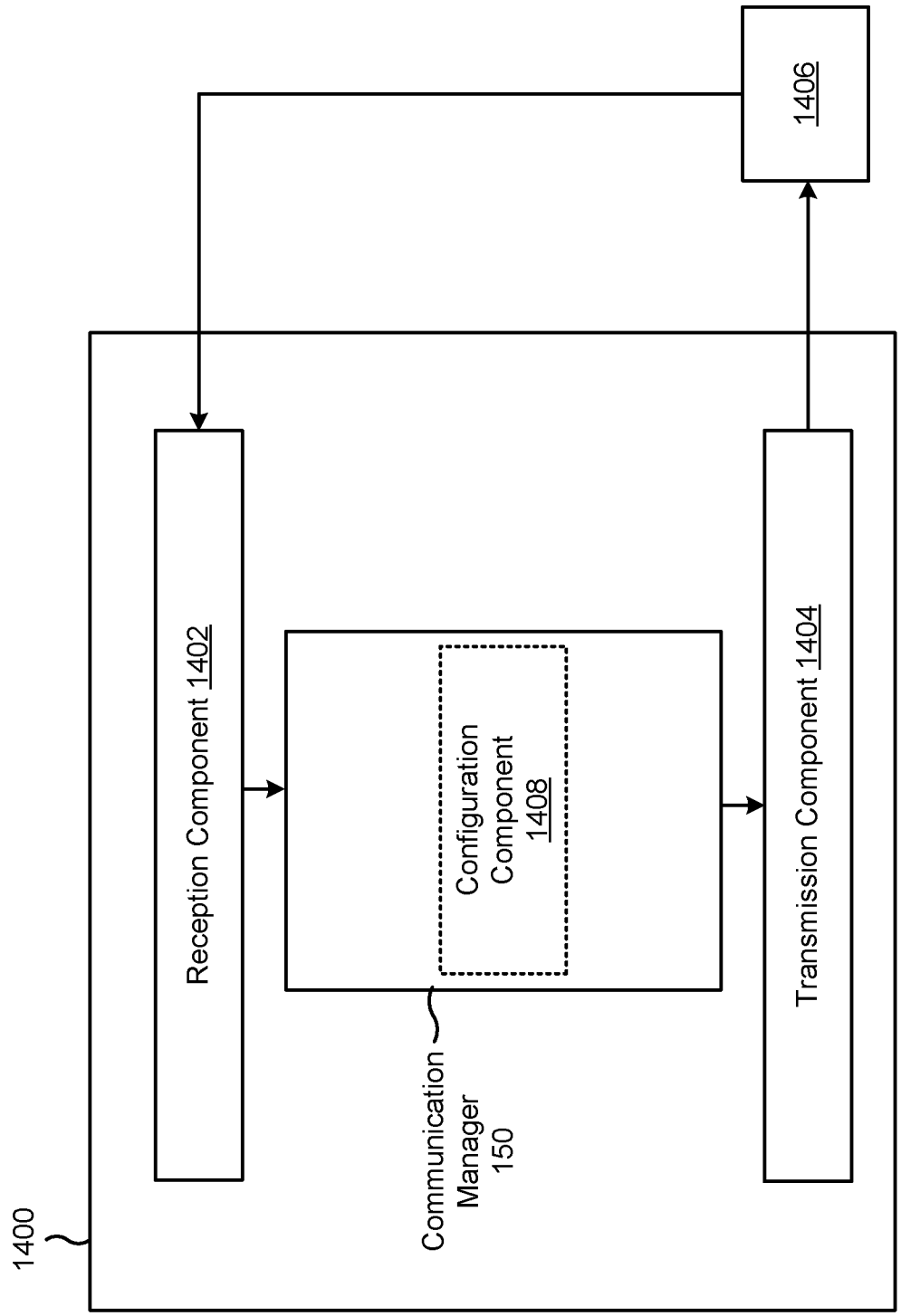
FIG. 14 is a diagram of an example apparatus for wireless communication, in accordance with the present disclosure.

FIG. 14 is a diagram of an example apparatus 1400 for wireless communication. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a network node, or another wireless communication device) using the reception component 1402 and the transmission component 1404. As further shown, the apparatus 1400 may include the communication manager 150. The communication manager 150 may include a configuration component 1408, among other examples.

In some aspects, the apparatus 1400 may be configured to perform one or more operations described herein in connection with FIGS. 7-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit an indication to perform PDCCH monitoring in a first monitoring span, of a first group of slots, and in a second monitoring span, of a second group of slots, wherein a start of the first monitoring span is at least a threshold number of slots away from a start of the second monitoring span.

The configuration component 1408 may transmit configuration information, such as the configuration information described above in connection with reference number 710 of FIG. 7, among other examples.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 15:
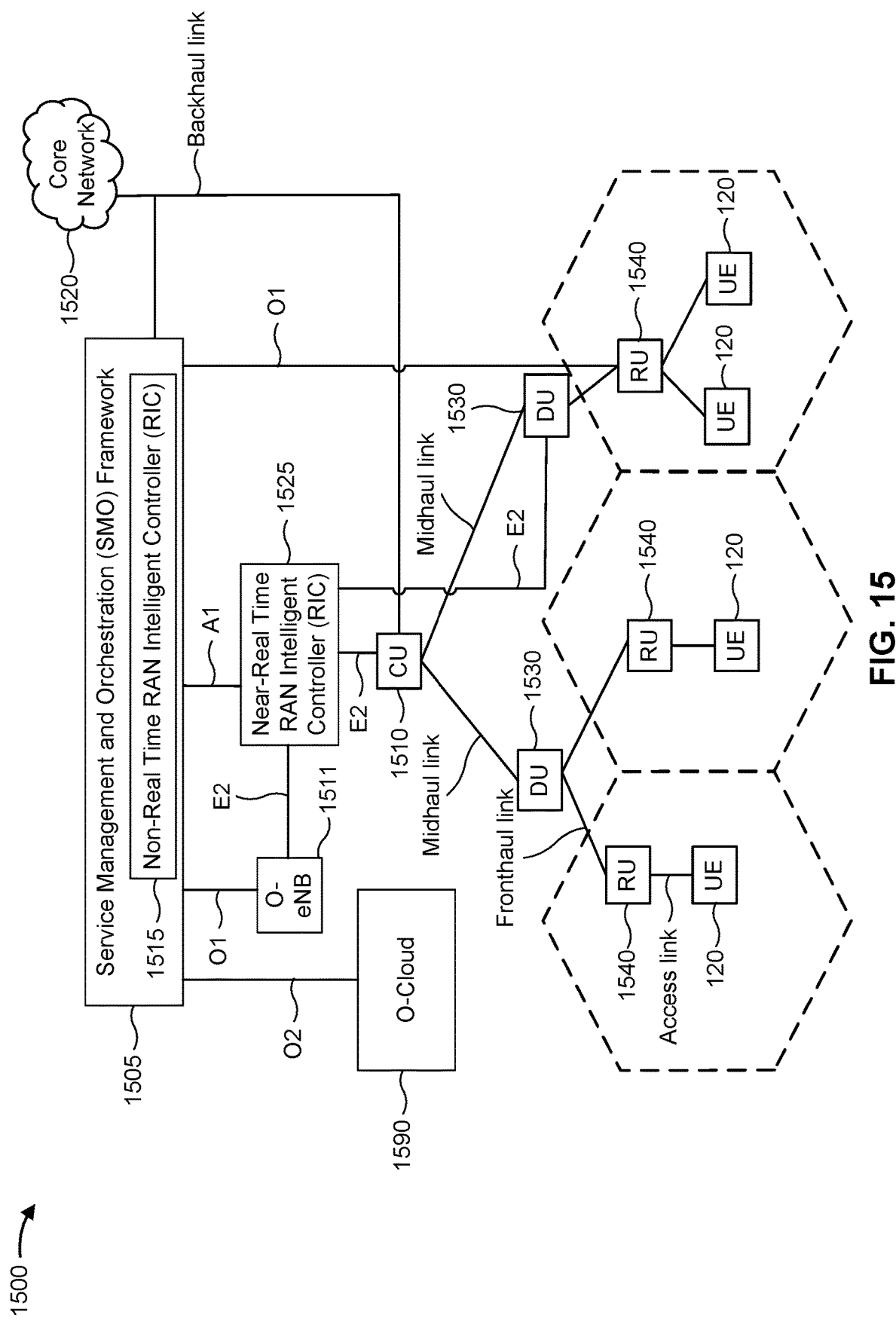
FIG. 15 is a diagram illustrating an example of a disaggregated base station architecture, in accordance with the present disclosure.

FIG. 15 is a diagram illustrating an example disaggregated base station architecture 1500, in accordance with the present disclosure. The disaggregated base station architecture 1500 may include a CU 1510 that can communicate directly with a core network 1520 via a backhaul link, or indirectly with the core network 1520 through one or more disaggregated control units (such as a Near-RT RIC 1525 via an E2 link, or a Non-RT RIC 1515 associated with a Service Management and Orchestration (SMO) Framework 1505, or both). A CU 1510 may communicate with one or more DUs 1530 via respective midhaul links, such as through F1 interfaces. Each of the DUs 1530 may communicate with one or more RUs 1540 via respective fronthaul links. Each of the RUs 1540 may communicate with one or more UEs 120 via respective radio frequency (RF) access links. In some implementations, a UE 120 may be simultaneously served by multiple RUs 1540.

Each of the units, including the CUs 1510, the DUs 1530, the RUs 1540, as well as the Near-RT RICs 1525, the Non-RT RICs 1515, and the SMO Framework 1505, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1510 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 1510. The CU 1510 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1510 can be logically split into one or more CU-UP units and one or more CU-CP units. A CU-UP unit can communicate bidirectionally with a CU-CP unit via an interface, such as the E1 interface when implemented in an O-RAN configuration. The CU 1510 can be implemented to communicate with a DU 1530, as necessary, for network control and signaling.

Each DU 1530 may correspond to a logical unit that includes one or more base station functions to control the operation of one or more RUs 1540. In some aspects, the DU 1530 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1530 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1530, or with the control functions hosted by the CU 1510.

Each RU 1540 may implement lower-layer functionality. In some deployments, an RU 1540, controlled by a DU 1530, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1540 can be operated to handle over the air (OTA) communication with one or more UEs 120. In some implementations, real-time and non-real-time aspects of control and user plane communication with the RU(s) 1540 can be controlled by the corresponding DU 1530. In some scenarios, this configuration can enable each DU 1530 and the CU 1510 to be implemented in a cloud-based RAN architecture, such as a vRAN architecture.

The SMO Framework 1505 may be configured to support RAN deployment and provisioning of non-virtualized and virtualized network elements. For non-virtualized network elements, the SMO Framework 1505 may be configured to support the deployment of dedicated physical resources for RAN coverage requirements, which may be managed via an operations and maintenance interface (such as an O1 interface). For virtualized network elements, the SMO Framework 1505 may be configured to interact with a cloud computing platform (such as an open cloud (O-Cloud) platform 1590) to perform network element life cycle management (such as to instantiate virtualized network elements) via a cloud computing platform interface (such as an O2 interface). Such virtualized network elements can include, but are not limited to, CUs 1510, DUs 1530, RUs 1540, non-RT RICs 1515, and Near-RT RICs 1525. In some implementations, the SMO Framework 1505 can communicate with a hardware aspect of a 4G RAN, such as an open eNB (O-eNB) 1511, via an O1 interface. Additionally, in some implementations, the SMO Framework 1505 can communicate directly with each of one or more RUs 1540 via a respective O1 interface. The SMO Framework 1505 also may include a Non-RT RIC 1515 configured to support functionality of the SMO Framework 1505.

The Non-RT RIC 1515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1525. The Non-RT RIC 1515 may be coupled to or communicate with (such as via an A1 interface) the Near-RT RIC 1525. The Near-RT RIC 1525 may be configured to include a logical function that enables near-real-time control and optimization of RAN elements and resources via data collection and actions over an interface (such as via an E2 interface) connecting one or more CUs 1510, one or more DUs 1530, or both, as well as an O-eNB, with the Near-RT RIC 1525.

In some implementations, to generate AI/ML models to be deployed in the Near-RT RIC 1525, the Non-RT RIC 1515 may receive parameters or external enrichment information from external servers. Such information may be utilized by the Near-RT RIC 1525 and may be received at the SMO Framework 1505 or the Non-RT RIC 1515 from non-network data sources or from network functions. In some examples, the Non-RT RIC 1515 or the Near-RT RIC 1525 may be configured to tune RAN behavior or performance. For example, the Non-RT RIC 1515 may monitor long-term trends and patterns for performance and employ AI/ML models to perform corrective actions through the SMO Framework 1505 (such as reconfiguration via an O1 interface) or via creation of RAN management policies (such as A1 interface policies).

As indicated above, FIG. 15 is provided as an example. Other examples may differ from what is described with regard to FIG. 15.

The following provides an overview of some Aspects of the present disclosure:

Aspect 1: A method of wireless communication performed by a user equipment (UE), comprising: receiving an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span; and selectively performing the PDCCH monitoring in the first monitoring span or the second monitoring span based at least in part on the indication.

Aspect 2: The method of Aspect 1, wherein the indication indicates that a location of the first monitoring span, in the first group of slots, is the same as a location of the second monitoring span, in the second group of slots.

Aspect 3: The method of any of Aspects 1-2, wherein each of the first monitoring span and the second monitoring span include a number of monitoring occasions, each of the monitoring occasions having a duration that is less than a duration of a slot.

Aspect 4: The method of Aspect 3, wherein the number of monitoring occasions in the first monitoring span is equal to the number of monitoring occasions in the second monitoring span.

Aspect 5: The method of any of Aspects 1-4, wherein selectively performing the PDCCH monitoring in the first monitoring span or the second monitoring span comprises: performing the PDCCH monitoring in the first monitoring span and the second monitoring span based at least in part on determining that the start of the first monitoring span and the start of the second monitoring span are separated by a number of slots that is greater than, or equal to, the threshold number of slots.

Aspect 6: The method of any of Aspects 1-5, wherein the first group of slots is associated with a first search space slot group (SSSG), and the second group of slots is associated with a second SSSG, wherein a switching boundary between the first SSSG and the second SSSG is aligned with a boundary between the first group of slots and the second group of slots.

Aspect 7: The method of Aspect 6, further comprising determining that the start of the first monitoring span is less than the threshold number of slots away from the start of the second monitoring span.

Aspect 8: The method of Aspect 7, further comprising dropping a monitoring occasion, in the first monitoring span or the second monitoring span, based at least in part on the start of the first monitoring span being less than the threshold number of slots away from the start of the second monitoring span.

Aspect 9: The method of Aspect 7, further comprising dropping all monitoring occasions, in the first monitoring span or the second monitoring span, based at least in part on the start of the first monitoring span being less than the threshold number of slots away from the start of the second monitoring span.

Aspect 10: The method of Aspect 7, wherein selectively performing the PDCCH monitoring in the first monitoring span or the second monitoring span comprises determining not to perform the PDCCH monitoring in the first monitoring span or the second monitoring span based at least in part on the start of the first monitoring span being less than the threshold number of slots away from the start of the second monitoring span.

Aspect 11: The method of any of Aspects 1-10, further comprising adjusting a boundary of the first SSSG, or a boundary of the second SSSG, such that the start of the first monitoring span and the start of the second monitoring span are separated by a number of slots that is greater than, or equal to, the threshold number of slots.

Aspect 12: The method of Aspect 11, wherein selectively performing the PDCCH monitoring in the first monitoring span or the second monitoring span comprises performing the PDCCH monitoring in the first monitoring span and the second monitoring span based at least in part on the adjusted boundary of the first SSSG or the adjusted boundary of the second SSSG.

Aspect 13: The method of Aspect 11, further comprising: identifying a location of the start of the first monitoring span; determining that the location of the start of the first monitoring span is less than the threshold number of slots away from the switching boundary; and adjusting the boundary of the first SSSG based at least in part on the determining that the location of the start of the first monitoring span is less than the threshold number of slots away from the switching boundary.

Aspect 14: A method of wireless communication performed by a network node, comprising: transmitting an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span.

Aspect 15: An apparatus for wireless communication at a device, comprising: a processor; memory coupled with the processor; and instructions stored in the memory and executable by the processor to cause the apparatus to perform the method of one or more of Aspects 1-13.

Aspect 16: A device for wireless communication, comprising a memory and one or more processors coupled to the memory, the one or more processors configured to perform the method of one or more of Aspects 1-13.

Aspect 17: An apparatus for wireless communication, comprising at least one means for performing the method of one or more of Aspects 1-13.

Aspect 18: A non-transitory computer-readable medium storing code for wireless communication, the code comprising instructions executable by a processor to perform the method of one or more of Aspects 1-13.

Aspect 19: A non-transitory computer-readable medium storing a set of instructions for wireless communication, the set of instructions comprising one or more instructions that, when executed by one or more processors of a device, cause the device to perform the method of one or more of Aspects 1-13.

Aspect 20: An apparatus for wireless communication at a device, comprising: a processor; memory coupled with the processor; and instructions stored in the memory and executable by the processor to cause the apparatus to perform the method of Aspect 14.

Aspect 21: A device for wireless communication, comprising a memory and one or more processors coupled to the memory, the one or more processors configured to perform the method of Aspect 14.

Aspect 22: An apparatus for wireless communication, comprising at least one means for performing the method of Aspect 14.

Aspect 23: A non-transitory computer-readable medium storing code for wireless communication, the code comprising instructions executable by a processor to perform the method of Aspect 14.

Aspect 24: A non-transitory computer-readable medium storing a set of instructions for wireless communication, the set of instructions comprising one or more instructions that, when executed by one or more processors of a device, cause the device to perform the method of Aspect 14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        receive an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span;
        selectively perform the PDCCH monitoring in the first monitoring span or the second monitoring span based at least in part on the indication; and
        drop a monitoring occasion, in the first monitoring span or the second monitoring span, based at least in part on the start of the first monitoring span being less than the threshold number of slots away from the start of the second monitoring span.

2. The apparatus of claim 1, wherein the indication indicates that a location of the first monitoring span, in the first group of slots, is the same as a location of the second monitoring span, in the second group of slots.

3. The apparatus of claim 1, wherein each of the first monitoring span and the second monitoring span include a number of monitoring occasions, each of the monitoring occasions having a duration that is less than a duration of a slot.

4. The apparatus of claim 3, wherein the number of monitoring occasions in the first monitoring span is equal to the number of monitoring occasions in the second monitoring span.

5. The apparatus of claim 1, wherein the one or more processors, to selectively perform the PDCCH monitoring in the first monitoring span or the second monitoring span, are configured to:
    perform the PDCCH monitoring in the first monitoring span and the second monitoring span based at least in part on determining that the start of the first monitoring span and the start of the second monitoring span are separated by a number of slots that is greater than, or equal to, the threshold number of slots.

6. The apparatus of claim 1, wherein the first group of slots is associated with a first search space slot group (SSSG), and the second group of slots is associated with a second SSSG, wherein a switching boundary between the first SSSG and the second SSSG is aligned with a boundary between the first group of slots and the second group of slots.

7. The apparatus of claim 6, wherein the one or more processors are further configured to determine that the start of the first monitoring span is less than the threshold number of slots away from the start of the second monitoring span.

8. The apparatus of claim 7, wherein the one or more processors are further configured to drop all monitoring occasions, in the first monitoring span or the second monitoring span, based at least in part on the start of the first monitoring span being less than the threshold number of slots away from the start of the second monitoring span.

9. The apparatus of claim 7, wherein the one or more processors, to selectively perform the PDCCH monitoring in the first monitoring span or the second monitoring span, are configured to determine not to perform the PDCCH monitoring in the first monitoring span or the second monitoring span based at least in part on the start of the first monitoring span being less than the threshold number of slots away from the start of the second monitoring span.

10. The apparatus of claim 6, wherein the one or more processors are further configured to adjust a boundary of the first SSSG, or a boundary of the second SSSG, so that the start of the first monitoring span and the start of the second monitoring span are separated by a number of slots that is greater than, or equal to, the threshold number of slots.

11. The apparatus of claim 10, wherein the one or more processors, to selectively perform the PDCCH monitoring in the first monitoring span or the second monitoring span, are configured to perform the PDCCH monitoring in the first monitoring span and the second monitoring span based at least in part on the adjusted boundary of the first SSSG or the adjusted boundary of the second SSSG.

12. The apparatus of claim 10, wherein the one or more processors are further configured to:
    identify a location of the start of the first monitoring span;
    determine that the location of the start of the first monitoring span is less than the threshold number of slots away from the switching boundary; and
    adjust the boundary of the first SSSG based at least in part on the determining that the location of the start of the first monitoring span is less than the threshold number of slots away from the switching boundary.

13. A method of wireless communication performed by a user equipment (UE), comprising:
    receiving an indication to perform physical downlink control channel (PDCCH) monitoring in a first monitoring span, of a first group of slots, and in a second monitoring span, of a second group of slots, wherein a start of the first monitoring span is at least a threshold number of slots away from a start of the second monitoring span;
    selectively performing the PDCCH monitoring in the first monitoring span or the second monitoring span based at least in part on the indication; and
    dropping a monitoring occasion, in the first monitoring span or the second monitoring span, based at least in part on the start of the first monitoring span being less than the threshold number of slots away from the start of the second monitoring span.

14. The method of claim 13, wherein the indication indicates that a location of the first monitoring span, in the first group of slots, is the same as a location of the second monitoring span, in the second group of slots.

15. The method of claim 13, wherein each of the first monitoring span and the second monitoring span include a number of monitoring occasions, each of the monitoring occasions having a duration that is less than a duration of a slot.

16. The method of claim 15, wherein the number of monitoring occasions in the first monitoring span is equal to the number of monitoring occasions in the second monitoring span.

17. The method of claim 13, wherein selectively performing the PDCCH monitoring in the first monitoring span or the second monitoring span comprises:
performing the PDCCH monitoring in the first monitoring span and the second monitoring span based at least in part on determining that the start of the first monitoring span and the start of the second monitoring span are separated by a number of slots that is greater than, or equal to, the threshold number of slots.

18. The method of claim 13, wherein the first group of slots is associated with a first search space slot group (SSSG), and the second group of slots is associated with a second SSSG, wherein a switching boundary between the first SSSG and the second SSSG is aligned with a boundary between the first group of slots and the second group of slots.

19. The method of claim 18, further comprising determining that the start of the first monitoring span is less than the threshold number of slots away from the start of the second monitoring span.

20. The method of claim 19, further comprising dropping all monitoring occasions, in the first monitoring span or the second monitoring span, based at least in part on the start of the first monitoring span being less than the threshold number of slots away from the start of the second monitoring span.

21. The method of claim 19, wherein selectively performing the PDCCH monitoring in the first monitoring span or the second monitoring span comprises determining not to perform the PDCCH monitoring in the first monitoring span or the second monitoring span based at least in part on the start of the first monitoring span being less than the threshold number of slots away from the start of the second monitoring span.

22. The method of claim 18, further comprising adjusting a boundary of the first SSSG, or a boundary of the second SSSG, so that the start of the first monitoring span and the start of the second monitoring span are separated by a number of slots that is greater than, or equal to, the threshold number of slots.

23. The method of claim 22, wherein selectively performing the PDCCH monitoring in the first monitoring span or the second monitoring span comprises performing the PDCCH monitoring in the first monitoring span and the second monitoring span based at least in part on the adjusted boundary of the first SSSG or the adjusted boundary of the second SSSG.

24. The method of claim 22, further comprising:
identifying a location of the start of the first monitoring span;
determining that the location of the start of the first monitoring span is less than the threshold number of slots away from the switching boundary; and
adjusting the boundary of the first SSSG based at least in part on the determining that the location of the start of the first monitoring span is less than the threshold number of slots away from the switching boundary.

\* \* \* \* \*